United States Patent
Besel et al.

(10) Patent No.: US 10,483,614 B2
(45) Date of Patent: Nov. 19, 2019

(54) EHF HINGE ASSEMBLIES

(71) Applicant: Keyssa Systems, Inc., Campbell, CA (US)

(72) Inventors: Alan Besel, Ridgefield, WA (US); Eric Sweetman, Portland, OR (US)

(73) Assignee: KEYSSA SYSTEMS, INC., Campbell, CA (US)

( * ) Notice: Subject to any disclaimer, the term of this patent is extended or adjusted under 35 U.S.C. 154(b) by 35 days.

(21) Appl. No.: 15/708,522

(22) Filed: Sep. 19, 2017

(65) Prior Publication Data

US 2019/0089037 A1    Mar. 21, 2019

(51) Int. Cl.
| | |
|---|---|
| *H01P 5/12* | (2006.01) |
| *H01Q 1/12* | (2006.01) |
| *H01P 5/02* | (2006.01) |
| *H04B 5/00* | (2006.01) |
| *H01P 5/04* | (2006.01) |
| *H01Q 1/22* | (2006.01) |
| *H01Q 21/28* | (2006.01) |
| *H04B 1/04* | (2006.01) |

(52) U.S. Cl.
CPC ............ *H01Q 1/125* (2013.01); *H01P 5/02* (2013.01); *H01P 5/04* (2013.01); *H01Q 1/2266* (2013.01); *H01Q 1/2283* (2013.01); *H01Q 21/28* (2013.01); *H04B 5/0031* (2013.01); *H04B 1/0475* (2013.01)

(58) Field of Classification Search
CPC ........ H01Q 1/08; H01Q 1/2266; H01Q 1/288; G06F 13/00; G06F 13/42; G06F 1/1681; G06F 1/1698; G06F 3/0481; G06F 3/0488; G06F 3/14; H01P 3/127; H01P 1/064; H01P 1/00; H01P 1/042; H01P 1/06; H01P 1/062; H01P 1/067; H01P 1/122; H01P 5/024; H01P 5/12
USPC .......... 343/882; 361/679.02, 679.26, 679.27; 333/105, 106, 108, 254, 256
See application file for complete search history.

(56) References Cited

U.S. PATENT DOCUMENTS

| | | | | | |
|---|---|---|---|---|---|
| 5,471,177 | A | * | 11/1995 | Hudspeth | H01P 1/2138 333/126 |
| 5,781,087 | A | * | 7/1998 | Milroy | H01P 1/065 333/257 |
| 6,448,869 | B1 | * | 9/2002 | Kich | H01P 1/122 333/106 |
| 8,917,149 | B2 | * | 12/2014 | Blech | H01P 1/165 333/21 A |
| 9,979,061 | B1 | * | 5/2018 | Droz | H01P 3/16 |
| 2011/0194240 | A1 | * | 8/2011 | Hansen | G06F 1/1698 361/679.28 |

(Continued)

*Primary Examiner* — Linh V Nguyen
(74) *Attorney, Agent, or Firm* — Van Court & Aldridge LLP

(57) ABSTRACT

Hinge assemblies that serve as conduits for guiding extremely high frequency (EHF) signals are disclosed herein. The hinge assembly can contain EHF signal energy as data is transmitted from one structure to the other and the hinge assembly can also include a one or more waveguides that define EHF signal pathways through which EHF signal energy is directed. Each hinge assembly may serve as a conduit structure for each coupled pair of contactless communication units (CCUs), and multiple hinge assemblies may be used as separate conduit structures each of several coupled pairs of contactless communication unit.

25 Claims, 25 Drawing Sheets

(56) References Cited

U.S. PATENT DOCUMENTS

| | | | |
|---|---|---|---|
| 2012/0235882 A1* | 9/2012 | Iverson | H01P 1/067 343/905 |
| 2014/0043745 A1* | 2/2014 | McCormack | G06F 13/00 361/679.09 |
| 2015/0138714 A1* | 5/2015 | Davis | G06F 1/1683 361/679.28 |
| 2017/0200997 A1* | 7/2017 | Gomberg | H01P 1/062 |

* cited by examiner

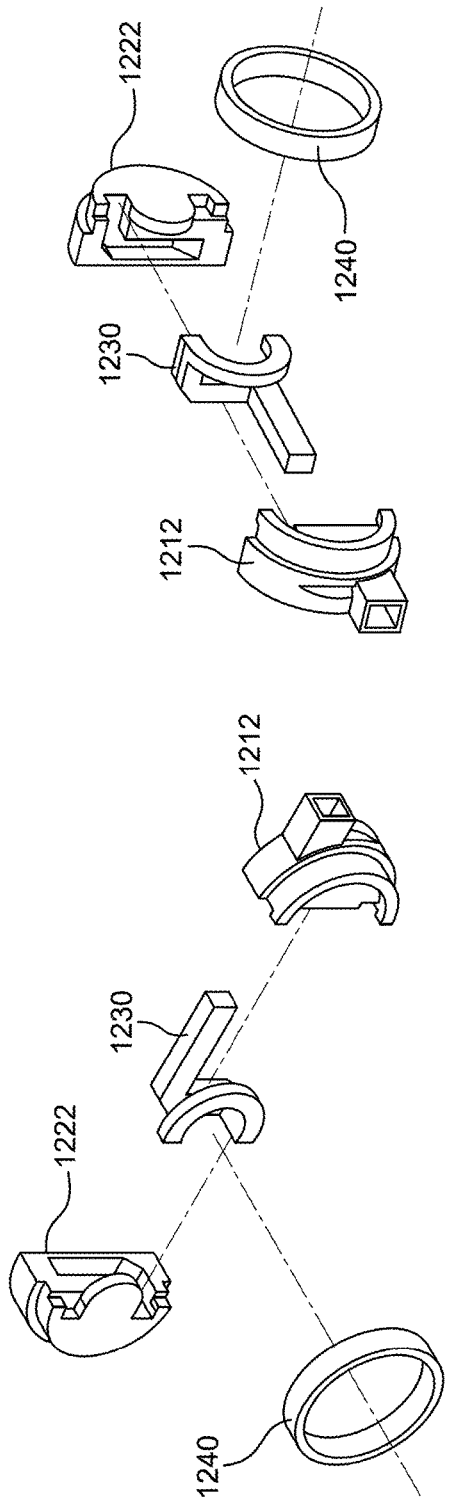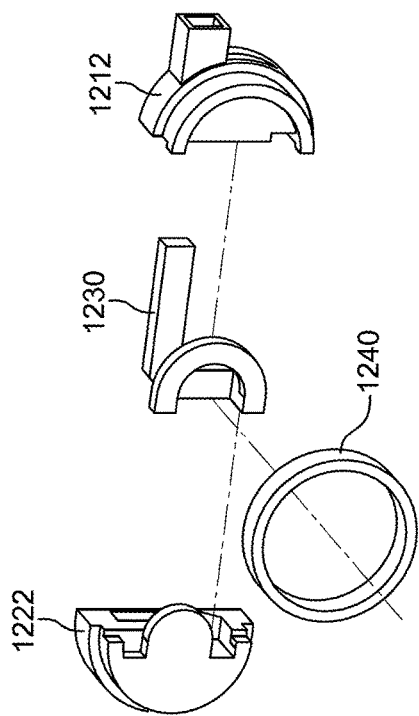
FIG. 12B
FIG. 12C
FIG. 12D

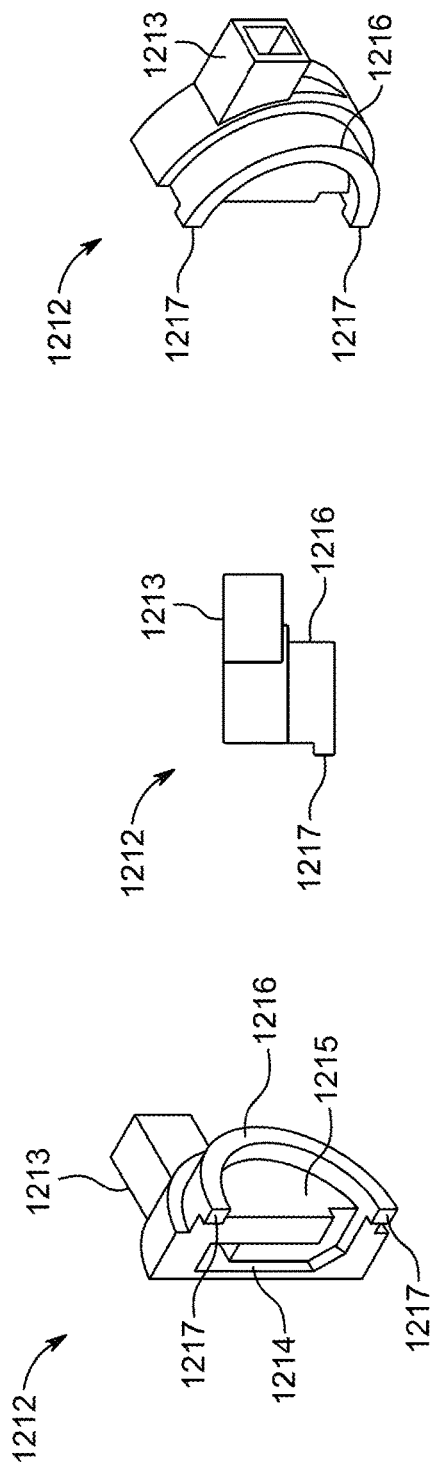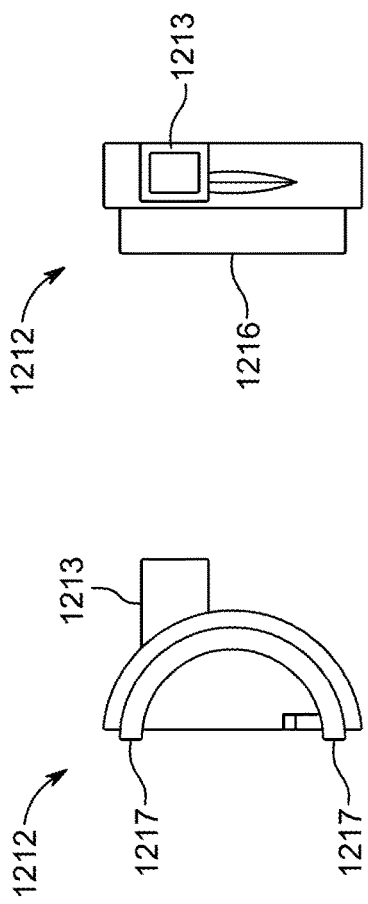

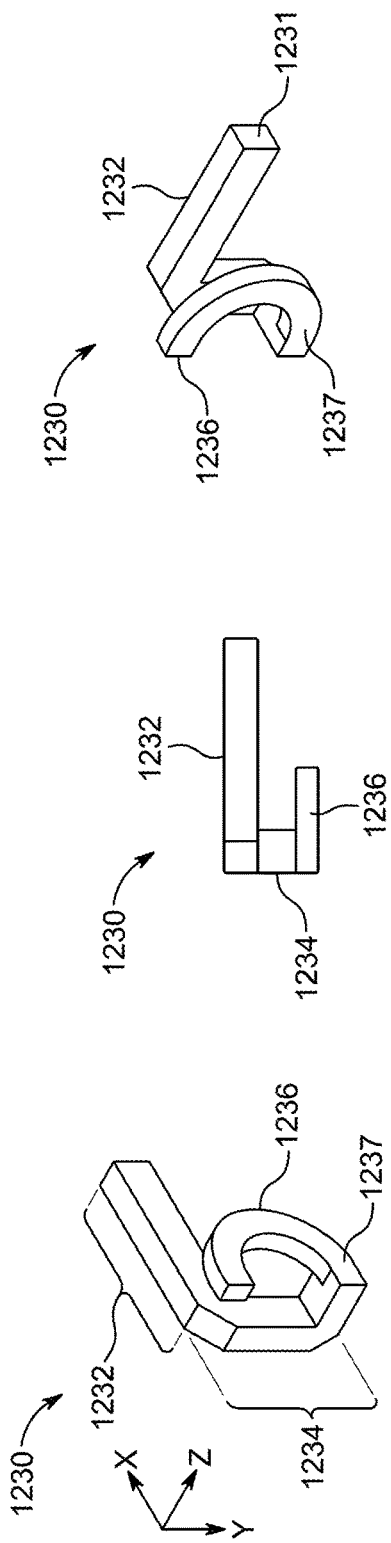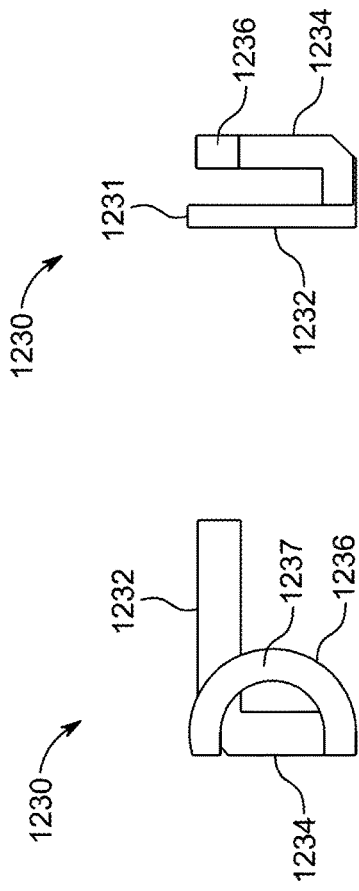
FIG. 15A  FIG. 15B  FIG. 15C  FIG. 15D  FIG. 15E

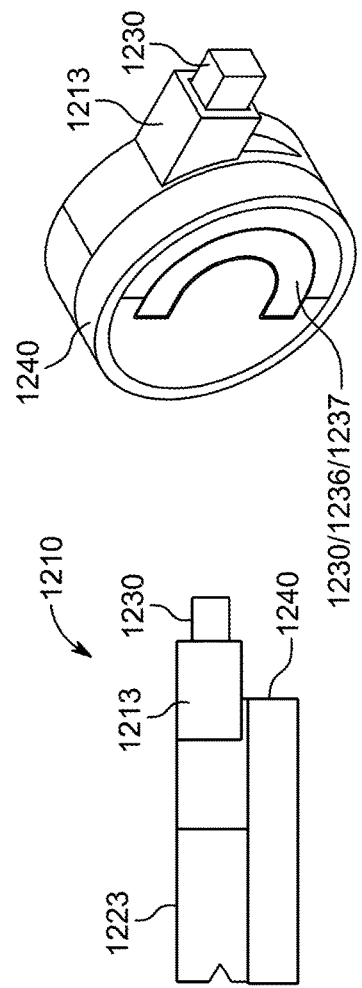
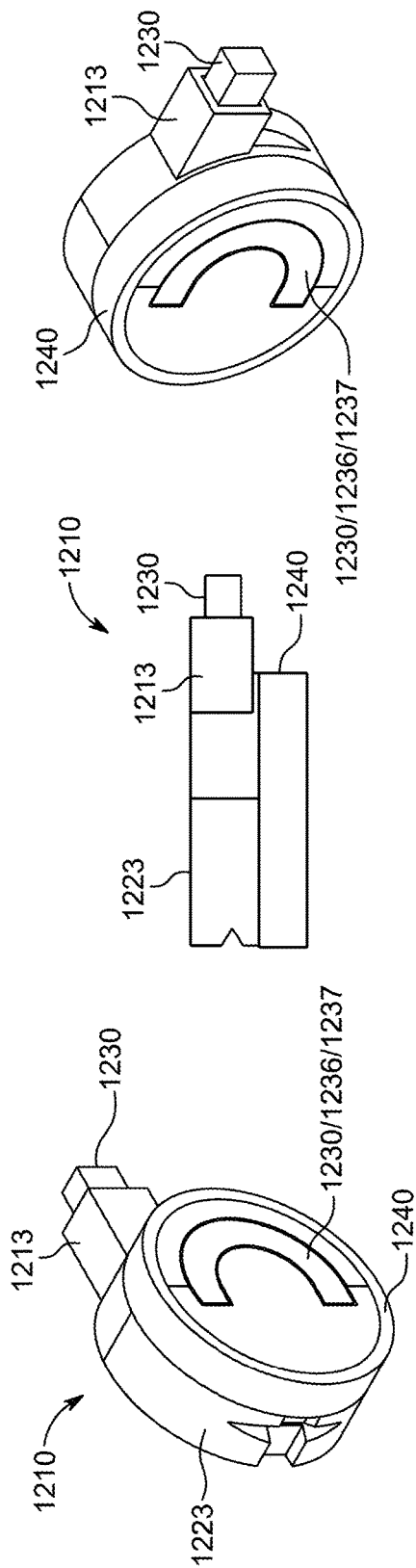
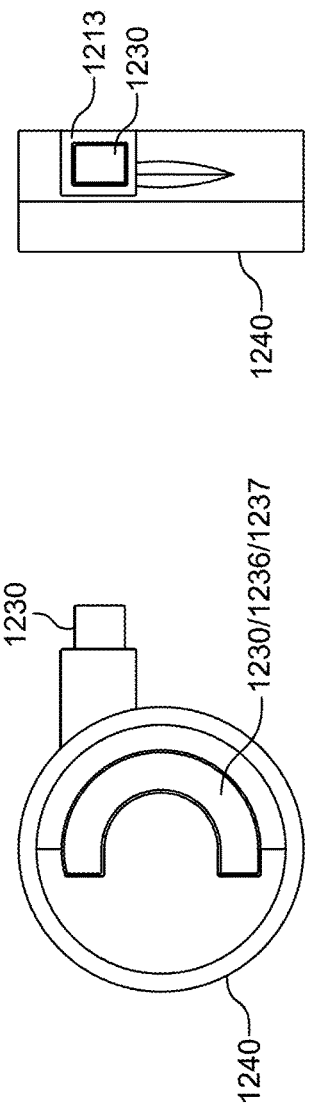

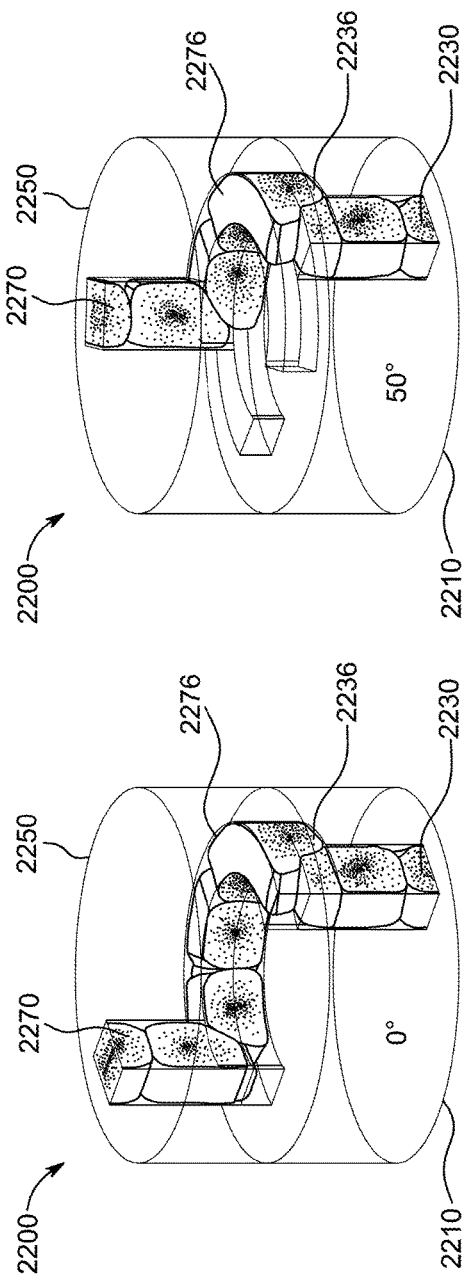
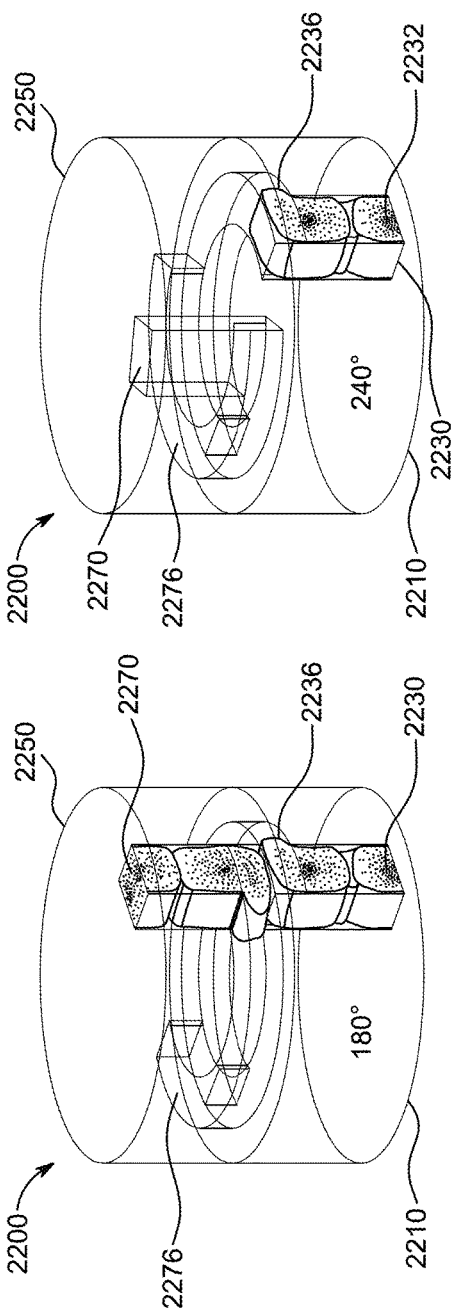
FIG. 22A
FIG. 22B
FIG. 22C
FIG. 22D

EHF HINGE ASSEMBLIES

TECHNICAL FIELD

This patent specification relates to hinges. More particularly, this patent specification relates to hinges that serve as contactless data conduits.

BACKGROUND

Advances in semiconductor manufacturing and circuit design technologies have enabled the development and production of integrated circuits (ICs) with increasingly higher operational frequencies in the non-wired realm. As a result, electronic products and systems incorporating such integrated circuits are able to provide much greater functionality than previous generations of products. This additional functionality has generally included the processing of increasingly larger amounts of data at increasingly higher speeds. The higher operation speeds can result in enhanced radio frequency signal propagation that has a tendency to disperse in undesired ways that can cause signal loss and crosstalk.

SUMMARY

Hinge assemblies that serve as conduits for guiding extremely high frequency (EHF) signals are disclosed herein. The hinge assembly can contain EHF signal energy as data is transmitted from one structure to the other and the hinge assembly can also include a one or more waveguides that define EHF signal pathways through which EHF signal energy is directed. Each hinge assembly may serve as a conduit structure for each coupled pair of contactless communication units (CCUs), and multiple hinge assemblies may be used as separate conduit structures each of several coupled pairs of contactless communication unit. A coupled pair of contactless communication units may refer to a contactless communications connection between a CCU in a first structure and a CCU in a second structure.

In one embodiment, a hinge assembly for use in propagating radio frequency signals is provided that includes a first subassembly comprising a first waveguide, wherein the first waveguide comprises a first self-sustaining signal propagation portion and a first co-dependent signal propagation portion, a second subassembly that interfaces with the first subassembly and moves at an angular rotation with respect to the first subassembly, the second subassembly comprising a second waveguide, wherein the second waveguide comprises a second self-sustaining signal propagation portion and a second co-dependent signal propagation portion. In a first range of angular rotation, the first and second co-dependent signal propagation portions are in direct contact with each other to form a propagation coupling between the first and second waveguides that enables the radio frequency signals to propagate through the hinge assembly. In a second range of angular rotation, the first and second co-dependent signal propagation portions are not in direct contact with each other and the radio frequency signals are not able to propagate through the hinge assembly.

In another embodiment, a hinge assembly is provided that includes a first subassembly that rotates about an axis, and a second subassembly that interfaces with the first subassembly and rotates about the axis. The second subassembly can include a first waveguide comprising a first waveguide interfacing region, and first and second members that partially enclose the first waveguide when the first and second members are coupled together to form a first integrated member having a first planar surface that is coplanar with the first waveguide interfacing region, wherein the first planar surface and the first waveguide interfacing region interface with the first subassembly.

In yet another embodiment, an electronic device is provided that includes a first EHF transceiver operative to transmit or receive EHF signals, a second EHF transceiver operative to transmit or receive EHF signals, a hinge assembly associated with the first and second EHF transceivers and comprising first and second waveguides, wherein the hinge assembly is operative to enable EHF signals to propagate between the first and second EHF transceivers via the hinge assembly when the first waveguide, which is associated with the first EHF transceiver, is in direct contact with the second waveguide, which is associated with the second EHF transceiver, such that when the first and second waveguides are in direct contact with each other, an EHF propagation coupling exists between the first and second waveguides, and when the first and second waveguides are not in direct contact with each other, the EHF propagation coupling does not exist.

A further understanding of the nature and advantages of the embodiments discussed herein may be realized by reference to the remaining portions of the specification and the drawings.

BRIEF DESCRIPTION OF THE DRAWINGS

FIG. 12B-12D show different exploded views of an illustrative hinge assembly according to an embodiment;

FIGS. 13A-13E show different views of a first member according to an embodiment;

FIGS. 15A-15E show different views of a waveguide according to an embodiment;

FIGS. 16A-16E show different illustrative views of an assembled subassembly according to an embodiment.

FIGS. 22A-22D show generic representations of hinge assemblies according to various embodiments;

DETAILED DESCRIPTION OF THE DISCLOSURE

Figure 1:
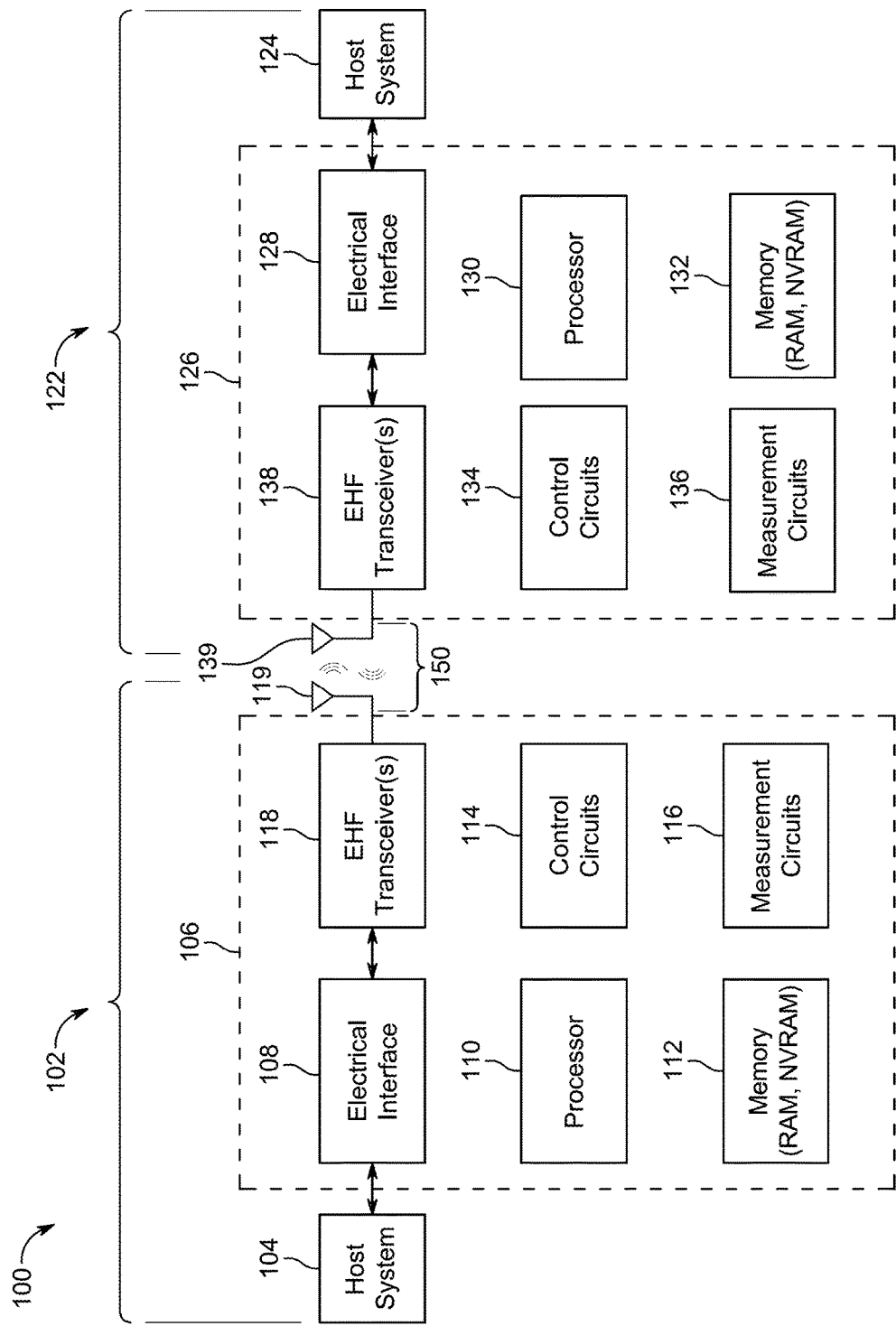
FIG. 1 illustrates a communications system, according to an embodiment.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In today's society and ubiquitous computing environment, high-bandwidth modular and portable electronic devices are being used increasingly. Security and stability of communication between and within these devices are important to their operation. In order to provide improved secure high-bandwidth communications, the unique capabilities of wireless communication between electronic devices and between sub-circuits within each device may be utilized in innovative and useful arrangements.

Such communication may occur between radio frequency communication units, and communication at very close distances may be achieved using EHF frequencies (typically, 30-300 GHz) in an EHF communication unit. An example of an EHF communications unit is an EHF comm-link chip.

Throughout this disclosure, the terms comm-link chip, and comm-link chip package are used to refer to EHF antennas embedded in IC packages. Comm-link chips are an example of a communication device, also referred to as contactless communication unit, a contactless communications transceiver unit (CCTU or EHF XCVR).

The term "transceiver" may refer to a device such as an integrated circuit ("IC") including a transmitter (Tx) and a receiver (Rx) so that the integrated circuit may be used to both transmit and receive information, such as data. Such a transceiver may be referred to herein as a CCU or an EHF XCVR. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to electromagnetic (EM) rather than electrical (wired, contact-based) connections and transport of signals between entities (such as devices). As used herein, the term "contactless" may refer to a carrier-assisted, dielectric coupling system. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF XCVRs described herein may be designed to adhere to various requirements mandated by one or more governments or their agencies. For example, the FCC may promulgate requirements for certification for transmitting data in an RF frequency band.

"Standards" and related terms such as "Standards-based", "Standards-based interfaces", "Standards-based protocol", "interface protocols," and the like may refer to legacy interface standards which may include but are not limited to USB (e.g., USB 2, USB 3, USB 3/2, or USB OTG), DisplayPort (DP), Thunderbolt, HDMI, SATA/SAS, PCIe, Ethernet SGMII, Hypertransport, Quickpath, I2S, GPIO, I2C and their extensions or revisions. For example, the term "interface protocol" may refer to the protocol being used by one system to communicate with another system. As a specific example, the interface protocol being used by a system may be a USB interface protocol; as such, the system may communicate according to the rules governing USB communications.

When transferring data between EHF communication units, the transfer speed and quality are optimal when an Rx is placed in the signal path where the Tx radiates maximum signal strength. Thus, higher data transfer efficiency is realized when the Rx and Tx are properly aligned with respect to each other. In addition, use of a reflective lens according to embodiments discussed herein can further increase the efficiency of data transfer by focusing dispersal of the EM signal energy.

FIG. 1 illustrates a communications system 100, wherein two electronic device subsystems or devices 102 and 122 may communicate with one another over at least one contactless communications link 150. Data may be transferred in at least one direction, from first device 102, which may be regarded as a source for sending the data to be transferred, to second device 122, which may be regarded as a destination for receiving the data to be transferred. With reference to FIG. 1, the transfer of data from first device 102 to second device 122 may be described. However, it should be understood that data may alternatively or additionally be transferred from second device 122 (e.g., acting as a source for sending the data) to first device 102 (e.g., acting as a destination for receiving the data), and that information may also be exchanged in both directions between devices 102 and 122 during a given communications session.

For illustrative clarity, devices 102 and 122 will be described as mirror images of one another, but it should be understood that the two devices 102 and 122 may be different from each other. For example, one of the devices may be a laptop computer or surface computer and the other device may be a mobile telephone or other portable device. Some examples of electronic devices which may benefit from the techniques disclosed herein may include cellular telephones (or handsets, or smart phones), computers, docks (e.g., docking stations), laptops, tablets, or comparable electronic devices, to name but a few.

First electronic device 102 may include a host system 104 and a contactless communication unit 106, which may be an EHF contactless communication unit, a smart contactless connector, a communication subsystem, a smart connector, a contactless connector, or simply a connector 106. The unit 106 associated with first device 102 may be generally capable of performing at least one of establishing and managing operation of contactless link 150 with unit 126 of second device 122, monitoring and modifying data passing through unit 106 onto link 150, and/or interfacing with and providing application support for host system 104. These functions of unit 106, with regard to interacting with link 150, the data, and host system 104, may be described and elaborated upon and discussed in greater detail in this disclosure.

Unit 106 associated with first device 102 may include some or all of the following elements: electrical interface 108, processor 110 and associated memory 112, control circuits 114, measurement circuits 116, one or more transceivers 118, and/or one or more transducers 119. The operation of these various elements (108-119) may be described and elaborated upon and discussed in greater detail in this disclosure.

Second electronic device 122 may include host system 124 and a contactless communication unit 126, which may be an EHF contactless communication unit, a smart contactless connector, a communication subsystem, a smart connector, a contactless connector, or simply a connector 126. Connector 126 associated with second device 122 may be generally capable of establishing and managing operation of contactless link 150 with unit 106 of first device 102, monitoring and modifying data passing though the unit 126 onto link 150, and/or interfacing with and/or providing application support for host system 124. These functions of unit 126, with regard to interacting with link 150, the data, and the host system 124, may be described and elaborated upon and discussed in greater detail in this disclosure.

Unit 126 associated with second device 122 may include some or all of the following elements: an electrical interface 128, processor 130 and associated memory 132, control circuits 134, measurement circuits 136, one or more transceivers 138, and/or one or more transducers 139. The operation of these various elements (128-139) may be described and elaborated upon and discussed in greater detail in this disclosure.

Units 106 and 126 may operate without intervention from host processors (e.g., processors of host systems 104 and 124, respectively), and/or may take control of the host systems 104 and 124, respectively, or portions thereof. Units 106 and 126 may open/activate applications, return status/power levels, connection parameters, data types, information on devices/systems that are connected, content information, amount and type of data being transferred, including device configuration based on connection type, link management, quota information, channel control, and the like.

The dashed-line rectangles shown (e.g., in FIG. 1) around units 106 and 126 may simply represent "partitioning" of functions, separating (e.g., distinguishing) units 106 and 126 from host system 104 and 124, respectively. The antennae shown (e.g., symbolically as transducers 119 and 139) outside of the dashed-line rectangles may be considered to be within the functional blocks of units 106 and 126, but may be disposed either internal or external to a communications chip constituting the contactless connector (e.g., for receiving EHF contactless signals from another antennae/transducer (e.g., across link 150)). The dashed-line rectangles shown (e.g., in FIG. 1) around units 106 and 126 may also represent non-conducting barriers (e.g., housings, enclosures, or the like, not shown), such as plastic or acrylic enclosures for units 106 and 126 or could also include entire devices 102 and 122, respectively, as described hereinabove.

Electrical interfaces 108 and 128 may include communications port(s)/channel(s) to communicate with any suitable portion(s) of host systems 104 and 124, respectively. Host systems 104 and 124 may have their own processors and associated circuitry (e.g., as described below with respect to FIG. 2 but not shown in FIG. 1). As mentioned, devices 102 and 122 may be described as mirror images of one another, but it should be understood that the two devices 102 and 122, and/or the two host systems 104 and 124, may be different than each other. For example, one of the devices or host systems may be a laptop computer, and the other device or host system may be a mobile telephone or an adapter for a mobile telephone. Some examples of electronic devices which may benefit from the techniques disclosed herein may include cellular telephones (or handsets, or smart phones), computers, docks (e.g., docking stations), laptops, tablets, or comparable electronic devices, to name but a few.

Processors 110 and 130 may be embedded microprocessors, or microcontrollers, or state machines, may run management operating systems (OSs) for the connection, and/or may have built-in authentication/encryption engines. Processors 110 and 130, either alone or in combination with other elements presented herein, may be operative to manage the communications link, to monitor data passing through the units and over the communications link, and/or to provide application support for a host system, or to execute one or more state machines, or variations thereof as may become evident from the several functional descriptions set forth herein. In a broader sense, units 106 and 126 may be capable of performing one of more of (at least one of) the various functions described herein.

Memory 112 and 132 may be any suitable memory, such as random access memory (RAM), non-volatile RAM (NVRAM, such as flash memory), or the like, and may include registers containing configuration, status, permissions, content permissions, keys for authentication/encryption, application(s) (e.g., software and/or firmware for use by processor 110 and 130), and the like.

Control circuits 114 and 134 may include any suitable circuitry that may be capable of monitoring the state of the link and/or actively appending to or changing data concurrently ("on-the-fly") as it goes through unit 106 or 126, respectively.

Measurement circuits 116 and 136 may include any suitable circuitry that may be capable of observing (e.g., monitoring) the connection state/status, the connection type, and/or the data being transmitted. Sensors (not shown) may be included to monitor signal strength, ambient environmental conditions, and the like. Signal-to-noise ratio can be used as an indicator of signal quality.

Transceivers 118 and 138 may include any transceivers (and associated transducers or antennas 119 and 139) that may be suitable for converting between electrical signals (e.g., for the host system) and EM signals (e.g., for the contactless communications link). Transceivers 118 and 138 may each be a half-duplex transceiver that can asynchronously convert a baseband signal into a modulated EHF carrier, which may be radiated from an internal or external antenna (e.g., as shown schematically), or can receive and demodulate the carrier and reproduce the original baseband signal. The EHF carrier may penetrate a wide variety of commonly-used non-conductive materials (e.g., glass, plastic, etc.).

It should be understood that if only one-way communication is required, such as from first device 102 to second device 122, transceiver 118 could be replaced by a Tx and transceiver 138 could be replaced by a Rx.

Transmit power and receive sensitivity for transceivers 118 and 138 may be controlled to minimize electromagnetic interference (EMI) effects and/or to simplify FCC certification, if appropriate.

Transceivers 118 and 138 may be implemented as IC chips comprising a Tx, a Rx, and related components. Transceiver chip(s) may be packaged in a conventional manner, such as in ball grid array (BGA) format. The antenna may be integrated into the package, or may be external to the package, or may be incorporated onto the chip itself. An exemplary unit 106, 126 may include one, two, or more transceiver chips. Some features or characteristics of transceivers 118 and 138 may include low latency signal path, multi-gigabit data rates, link detection, and/or link training. The signals transmitted by transceivers 118 and 138 may be modulated in any suitable manner to convey the data being transferred from one device to the other device, some non-limiting examples of which are presented herein. Modulation may be OOK (on/off keying), ASK (amplitude shift keying), PSK (phase shift keying), QPSK (quadrature phase shift keying), QAM (quadrature amplitude modulation), or other suitable modulation techniques. Signals may be encoded and packetized and transmitted by one transceiver (e.g., transceiver 118), and received and unpacketized and decoded by another transceiver (e.g., transceiver 138). Out-of-band signaling or other suitable techniques may be used to convey information other than or related to the data being transferred between the two devices.

Transceivers 118 and 138, or individual transmitters and receivers, which may be implemented as chips, may be factory-serialized, so that the chips and their transmissions may be 'tagged' (e.g., fingerprinted), which may enable a later forensic analysis to be performed for digital rights management. For example, protected (e.g., premium) content could be freely (e.g., unimpededly) transferred from one device to another, but the transaction could be traced to the specific devices involved, so that the participants in the transaction can be held accountable (e.g., billed). Premium protected content may be modified, data appended thereto, and/or can be logged with chip ID, user ID, or by other means.

Communications link 150 may be a contactless link, and the first and second units 106 and 126 may be contactless connectors, as described herein. Differences between units 106 and 126 disclosed herein and conventional mechanical connectors may be immediately apparent, and may be described herein. The units may be considered to be communication subsystems of a host device. In this regard, differences between the contactless connectors 106 and 126 disclosed herein and controllers such as Standards controllers, including Ethernet, may not be immediately apparent in that both may handle data flow between a host system and a communications link. However, a distinction between the contactless connectors disclosed herein and exemplary Standards controllers may be that the contactless connectors disclosed herein may both set up the contactless communications link and transfer data from a host system directly onto the contactless communications link, without the intermediary, for example, of mechanical connectors and/or a cable that utilize an electrical conduction medium rather than an RF medium. Further distinctions may be made in the way that the contactless connectors disclosed herein may be capable of operating independently and/or transparently from the host system, without requiring host awareness or interaction.

Data transfer between electronic devices 102 and 122 may be implemented over a contactless RF EM communications link 150, which may be handled substantially entirely by the units 106 and 126 of first and second devices 102 and 122, respectively. Signals flowing between units 106 and 126 of devices 102 and 122 may occur electromagnetically over a non-electrical (e.g., dielectric) medium, such as an air gap, waveguide, plastics (e.g., polyethylene, thermoplastic polymers, polyvinylidene difluoride, fluoropolymers, ABS, and other plastics), including combinations of these materials. The EHF signal can pass through other dielectric materials such as cardboard. The EHF signal can pass through a series of different dielectric materials and/or waveguides. Alternatively, the signals may pass by way of a slot antenna in a conductive medium, where the slot antenna may direct the contactless connectivity in a desired direction. A device (e.g., at least the contactless connector) may be substantially fully enclosed by a conductive medium other than at a location where it may be desired to emit and/or receive EHF radiation from a partner device (e.g., at least the contactless connector thereof), which may also be similarly substantially fully enclosed by a conductive medium. In embodiments discussed here, the EHF signal may pass through a rotatable hinge assembly.

Due to the high data rate enabled by the EHF contactless communication unit, large data files, such as movies, audio, device images, operating systems, and the like may be transferred in very short periods of time in contrast with existing technologies such as NFC (near field communications). As an example, a 1 Gigabyte data file may be transferred in as little as 2 seconds. The electromagnetic communication may typically be over an air gap that may be limited to a short range, such as, for example, 0-5 cm. A dielectric medium, such as a dielectric coupler, may be used to extend the range of the contactless link between the devices 102 and 122 to several centimeters, meters, or more.

It should be understood that in this, and any other embodiments of contactless links discussed herein, an overall communications system may be implemented as a combination of contactless and physical links. Furthermore, some of the techniques described herein may be applied to transferring data over a physical link. In such a link, the transceiver can contactlessly transmit data to a cable that may serve as a physical conduit for the data.

One or both of devices 102 and 122 may have two or more transceivers. Having two or more transceivers may support a feedback loop, full duplex operation, and/or may simultaneously establish a second communications link (e.g., for communicating with the host system). An exemplary "data flow" may proceed as follows: data originating from host system 104 or data originating at unit 106 may be provided by unit 106, via its transceiver 118 and transducer 119, onto the communications link 150. The data may pass through or over communications link 150. Data received from the communications link 150 by transducer 139 and transceiver 138 of unit 126 may be provided to host system 124 or may remain with unit 126. Data may flow in the reverse direction, from host system 124 via unit 126 or originating at unit 126, onto the contactless link 150 to unit 106 which may pass the data to host system 104. Although not shown, each one of units 106 and 126 may include one or more suitable busses for communicating data and/or power between various components 108-119 and/or between various components 128-139.

Figure 2:
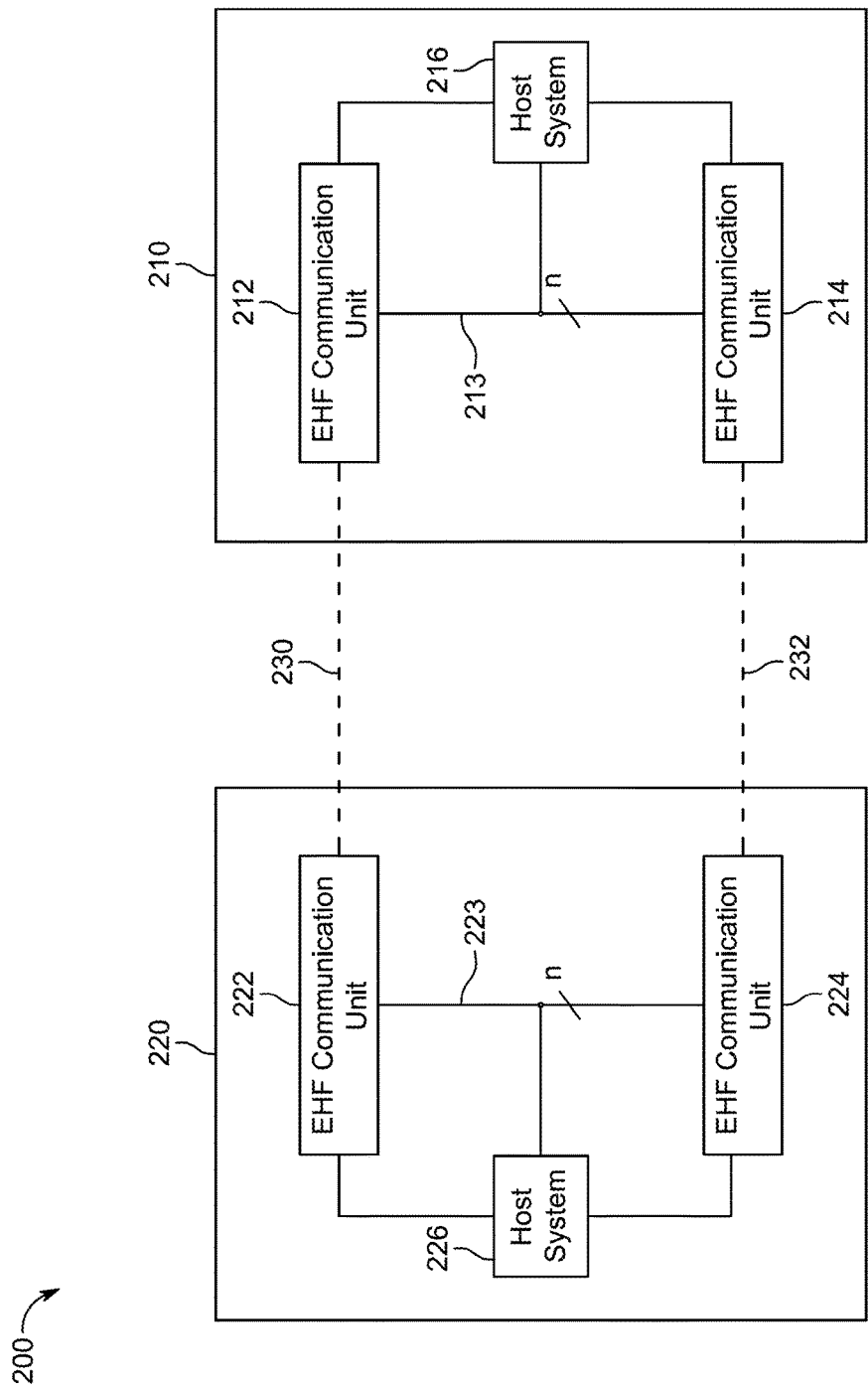
FIG. 2 illustrates a communications system having two electronic devices that communicate with one another over two or more contactless communications links, according to an embodiment.

FIG. 2 illustrates a communications system 200 wherein two electronic device subsystems or devices 210 and 220 may communicate with one another over two or more contactless communications links, according to an embodiment. System 200 may be similar to system 100 in many respects but, for illustrative and simplified discussion purposes, shows that each device may include two EHF communication units. Moreover, any EHF communication unit in system 200 may be the same or substantially the same as any EHF communication unit in system 100. As such, a more simplified representation of units 106 and 126 is shown in FIG. 2. In some embodiments, each device can include several EHF communication units. First device 210 may include EHF communication unit 212, EHF communication unit 214, and host system 216. One or more wired paths 213 may directly connect EHF communication units 212 and 214 together. Host system 216 may communicate with EHF communication units 212 and 214. In some embodiments, EHF communication units 212 and 214 may communicate with each other through host system 216. In other embodiments, host system 216 may be able to drive a signal on at least one of wired paths 213. Similarly, second device 220 may include EHF communication unit 222, EHF communication unit 224, and host system 226. One or more wired paths 223 may directly connect EHF communication units 222 and 224 together. Host system 226 may communicate with EHF communication units 222 and 224. In some embodiments, EHF communication units 222 and 224 may communicate with each other through host system 226. In other embodiments, host system 226 may be able to drive a signal on at least one of wired paths 223. Host systems 216 and 226 may be similar to host systems 104 and 124, both of which include circuitry specific to their respective subsystems or devices, and may thereby enable subsystems or devices 210 and 220 to operate for their intended functionality. In another embodiment, wired paths 213 and 223 may instead be EHF contactless communications links.

In some embodiments, each of EHF communication units 212, 214, 222, and 224 can be the same as EHF communication unit 106 or 126, discussed above. As such, EHF communication units 212, 214, 222, and 224 may include transceivers that may be capable of being configured to transmit and/or receive EHF signals. For example, in one approach, units 212 and 224 can be configured to receive EHF signals and units 214 and 222 can be configured to transmit EHF signals. Thus, in this approach, a contactless communications link 230 may exist between EHF communication units 222 and 212, and a contactless communications link 232 may exist between EHF communication units 214 and 224. As shown, units 212 and 222 may work together as a coupled pair of units that may communicate via link 230, and units 214 and 224 may work together as another coupled pair of units that may communicate via link 232. If one or more additional coupled pairs of units were to be included in system 200, then additional communications links would also exist.

After the EHF contactless communication units progress through their respective state machines and establish the links, and data no longer needs to be communicated across the links, the units can enter in a power savings state or data transport idle state depending on whether they are being implemented as a Tx or Rx unit. The power savings state may enable an EHF communication unit to power down selective circuitry, after the EHF communication link has been established, when there may be no data to be communicated over the link. The Tx unit may transmit a "keep alive" signal to the Rx unit to prevent it from timing out and exiting out of its power savings state. The Rx unit may be periodically turned on to monitor whether the Tx is sending the "keep alive" signal. The Tx and Rx units may transition to a new state (e.g., a data transport state) when they receive instructions to do so. As a specific example, an apparatus can include an EHF transceiver and control circuitry. The control circuitry may be operative to control establishment of an EHF communications link with another apparatus by executing a state machine that may transition from state to state in response to satisfaction of any one of a plurality of conditions, establish the EHF communication link with the apparatus to selectively enable one of transmission and reception of data, after the EHF communication link with the apparatus may be established, monitor an absence of data being communicated over the EHF communication link, and enter into a power savings state in response to the monitored absence of data being communicated over the EHF communication link until the state machine transitions to a new state.

Both devices 210 and 220 have the ability to control activation and deactivation of the links existing between the two devices. For example, if the links are in a power savings mode, and device 210 decides it wishes to transmit data to device 220, device 210 may change a signal state on one of the pins of one of its EHF units to bring it out of sleep and into an active data transport ready state. In response to the change in signal state, it may transmit a signal over the contactless communications link to its counterpart EHF unit, which may exit out of its power state and enter into an active data transport state. In addition, the counterpart EHF unit may inform other circuitry within device 220 that incoming data traffic is about to commence and that any appropriate changes are put into effect so that the data can be handled properly. For example, in the context of various embodiments described herein, when the counterpart EHF unit is contained in an adapter device that is electrically coupled to a user device, the counterpart EHF unit may provide a signal that causes adapter circuitry to turn off an active connection coupling a memory to the user device and activate a connection coupling the memory to the EHF unit.

Figure 3:
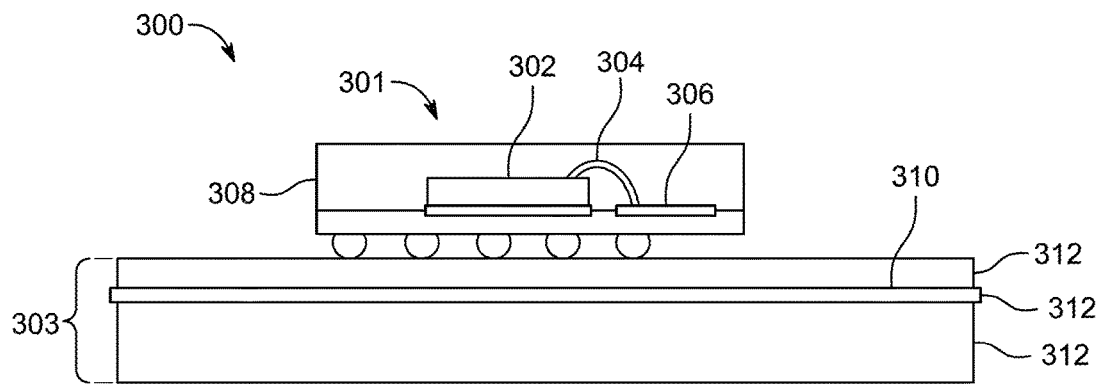
FIG. 3 is a side view of an exemplary EHF communication circuit showing a simplified view of some structural components.

FIG. 3 is a side view of an exemplary EHF communication circuit 300 showing a simplified view of some structural components. As illustrated, the communication circuit may include an integrated circuit package 301 that includes die 302 mounted on connector printed circuit board (PCB) 303, a lead frame (not shown), one or more conductive connectors such as bond wires 304, a transducer such as antenna 306, and an encapsulating material 308.

Die 302 may include any suitable structure configured as a miniaturized circuit on a suitable die substrate, and is functionally equivalent to a component such as a chip or an integrated circuit (IC). The die substrate may be formed using any suitable semiconductor material, such as, but not limited to, silicon. Die 302 may be mounted in electrical communication with the lead frame. The lead frame may be any suitable arrangement of electrically conductive leads configured to allow one or more other circuits to operatively connect with die 302. The leads of the lead frame may be embedded or fixed in a lead frame substrate. The lead frame substrate may be formed using any suitable insulating material configured to substantially hold the leads in a predetermined arrangement.

Further, the electrical communication between die 302 and leads of the lead frame may be accomplished by any suitable method using conductive connectors such as, one or more bond wires 304. Bond wires 304 may be used to electrically connect points on a circuit of die 302 with corresponding leads on the lead frame. In another embodiment, die 302 may be inverted and conductive connectors including bumps, or die solder balls rather than bond wires 304, which may be configured as a flip chip arrangement. Transducer 306 may be any suitable structure configured to convert between electrical and electromagnetic signals. In some embodiments, transducer 306 is an antenna. Transducer 306 in conjunction with the circuitry on die 302 may be configured to operate in an EHF spectrum, and may be configured to transmit and/or receive electromagnetic signals, in other words as a transmitter, a receiver, or a transceiver. In an embodiment, transducer 306 may be constructed as a part of the lead frame. IC package 301 may include more than one transducer 306. In another embodiment, transducer 306 may be separate from, but operatively connected to die 302 by any suitable method, and may be located adjacent to die 302. For example, transducer 306 may be connected to die 302 using bond wires. Alternatively, in a flip chip configuration, transducer 306 may be connected to die 302 without the use of the bond wires. In other embodiments, transducer 306 may be disposed on die 302 or on PCB 303.

Encapsulating material 308 may hold the various components of IC package 301 in fixed relative positions. Encapsulating material 308 may be any suitable material configured to provide electrical insulation and physical protection for the electrical and electronic components of the IC package. For example, encapsulating material 308 may be a mold compound, glass, plastic, or ceramic. Encapsulating material 308 may be formed in any suitable shape. For example, encapsulating material 308 may be in the form of a rectangular block, encapsulating all components of the IC package except the unconnected leads of the lead frame. One or more external connections may be formed with other circuits or components. For example, external connections may include ball pads and/or external solder balls for connection to a printed circuit board.

IC package 301 may be mounted on a connector PCB 303. Connector PCB 303 may include one or more laminated layers 312, one of which may be a PCB ground plane 310. PCB ground plane 310 may be any suitable structure configured to provide an electrical ground to circuits and components on the IC package. With the placement of the ground layer, at an appropriate distance from the antenna, the electromagnetic radiation pattern may be directed outwards from the substrate.

Figure 4:
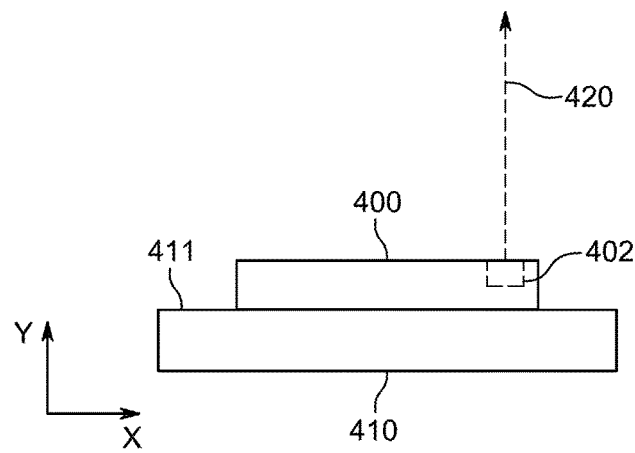
FIG. 4 shows a simplified and illustrative EHF CCU mounted to a substrate, according to an embodiment.
Figure 5:
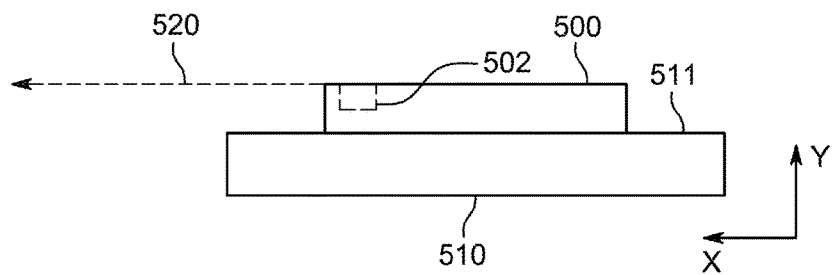
FIG. 5 shows another simplified and illustrative EHF CCU mounted to a substrate, according to an embodiment.

FIG. 4 shows a simplified and illustrative EHF CCU 400 mounted to substrate 410, according to an embodiment. CCU 440 may include transducer 402 that is designed to transmit contactless EHF signals in the direction of signal path 420. Path 420 projects in a direction perpendicular to surface 411 of substrate 410. In other words, path 420 projects in the Y-axis direction. The direction of signal path 420 is merely illustrative. For example, the signal path can be directed in any suitable direction. For example, FIG. 5 shows a simplified and illustrative EHF CCU 500 mounted to substrate 510. CCU 500 may include transducer 502 that is designed to transmit contactless EHF signals in the direction of signal path 520. Path 520 projects in a direction co-planar to surface 511 of substrate 510. In other words, path 520 projects in the X-axis direction.

Thus, although it may be desirable for EHF signals to be transmitted along a desired signal path (e.g., such a path 420 or 520), non-directed, free flowing EHF signal energy may emit in all directions, thereby resulting in radiation patterns that are not confined to the desired signal path. Non-directed transmission of EHF signals in undesired directions may cause cross-talk. Such cross-talk may exist over-the-air, within circuit boards, and/or within device housings. In addition, non-directed transmission of EHF signals may also result in reduced signal strength, thereby potentially making it more difficult for receiving CCUs to capture the EHF signals.

Figure 6:
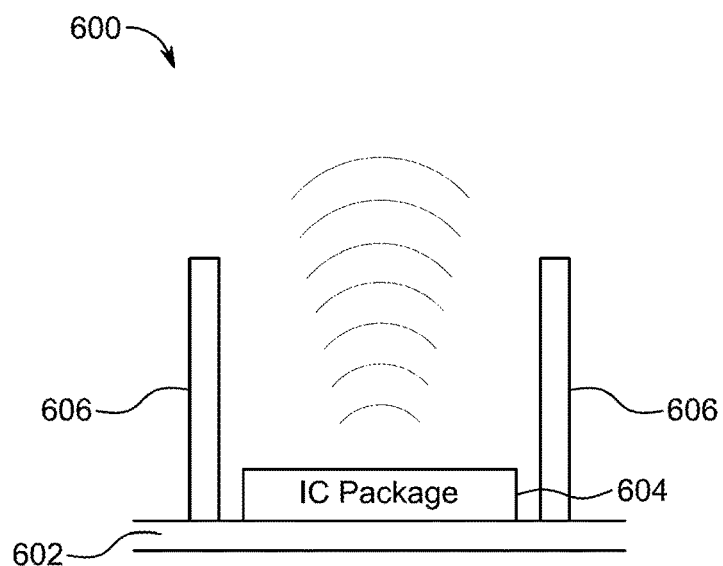
FIG. 6 illustrates one IC package mounted to a printed circuit board, according to an embodiment.

FIG. 6 illustrates one IC package 604 mounted to the PCB 602. However, in other implementations, more than one IC package can be mounted to the same PCB 602. The communication module 600 can be part of a communication system of a device, e.g., a computer, mobile phone, tablet, kiosk, or other device/system. Signal guiding structure 606 extends upward from PCB 602. The communication system can be configured to provide wireless communication using one or more IC packages. For example, the communication system can include two IC packages, one configured as a transmitter and the other configured as a receiver. The communication system can be in communication with a storage device. Thus, for example, the communication system can transfer data between the data storage unit and an external device using wireless communication provided by the IC packages.

Figure 7:
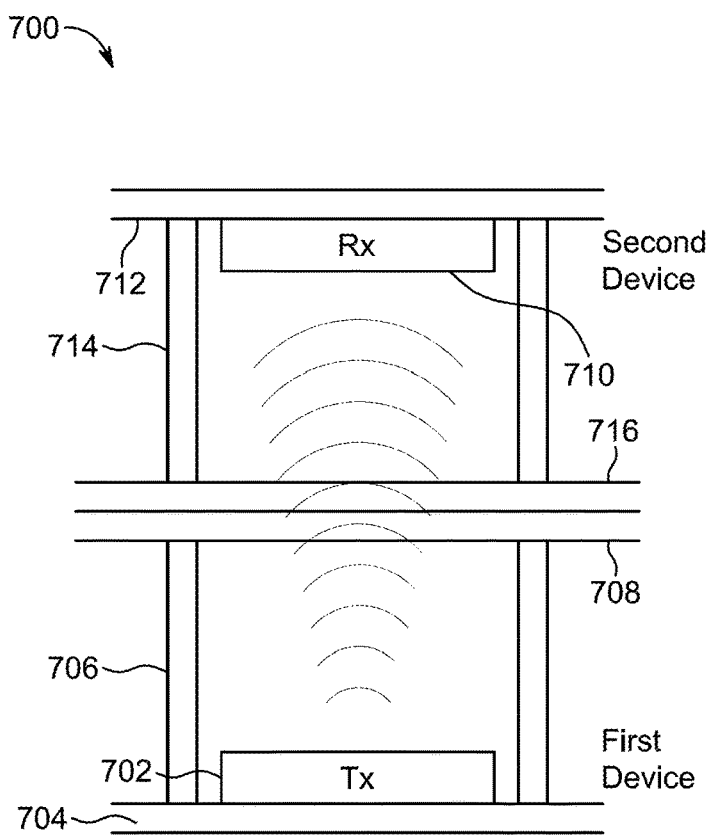
FIG. 7 is a side view diagram illustrating an example of communication between a transmitter and a receiver, according to an embodiment.

FIG. 7 is a side view diagram 700 illustrating an example of communication between a transmitter and a receiver. For example, a first device may exchange data with a second device. The two devices can be positioned in proximity to each other such that the respective communication modules for transmitting and receiving data are aligned and in range of each other. In particular, for EHF frequencies, the devices may be very close to each other to optimize transmissions. For example, the external housing of the devices may need to be in physical contact to facilitate data communication.

In FIG. 7, a first device includes a first communication module having a transmitter IC package 702 positioned on a first PCB 704. The transmitter IC package 702 is surrounded by a first signal guiding structure 706 forming a channel. The first signal guiding structure 706 extends to a surface of a first housing 708 of the first device. For example, the first device can be a first mobile phone and the first housing 708 can correspond to the outer case of the first mobile phone.

A second device includes a second communication module having a receiver IC package 710 positioned on a second PCB 712. The receiver IC package 710 is surrounded by a second signal guiding structure 714 forming a channel. The second signal guiding structure 714 extends to a surface of a second housing 716 of the second device. For example, the second device can be a second mobile phone and the second housing 716 can correspond to the outer case of the second mobile phone.

As illustrated by diagram 700, the first signal guiding structure 706 and the second signal guiding structure 714 are aligned and an outer surface of the first housing 708 and the second housing 716 are in physical contact to provide minimal communication distance and interference. A data transmission from the transmitter IC package 702 passes along the first signal guiding structure 706 and the second signal guiding structure 714 to the receiving IC package 710.

Figure 8:
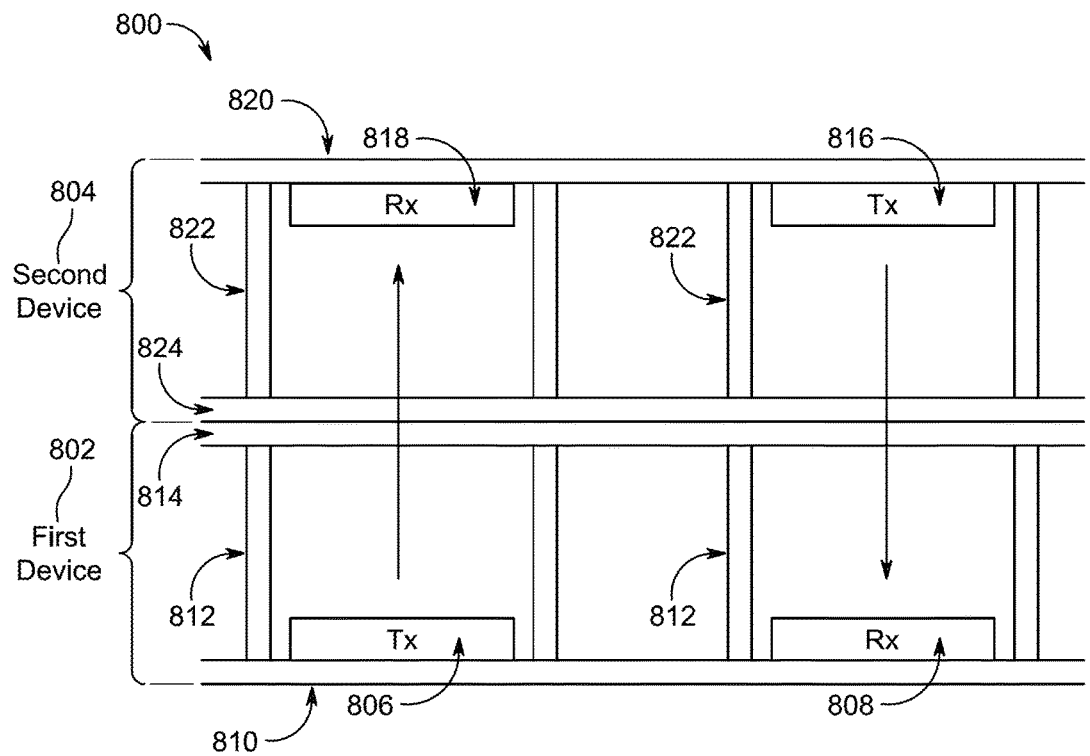
FIG. 8 shows a side view diagram illustrating an example of communication between a pair of transmitters and receivers, according to an embodiment.

FIG. 8 shows a side view diagram 800 illustrating an example of communication between a pair of transmitters and receivers. Diagram 800 includes a portion of a first device 802 and a second device 804. The first device 802 includes a first transmitter IC package 806 and a first receiver IC package 808 mounted to a first PCB 810. Each of the first transmitter IC package 806 and the first receiver IC package 808 is encircled by a respective first signal guiding structure 812. The first signal guiding structure 812 forms a channel extending to a surface of a first housing 814 of the first device 802. For example, the first device 802 can be a first mobile phone and the first housing 814 can correspond to the outer case of the first mobile phone. The second device 804 includes a second transmitter IC package 816 and a second receiver IC package 818 mounted to a second PCB 820. Each of the second transmitter IC package 816 and the second receiver IC package 818 is encircled by a respective second signal guiding structure 822. The second signal guiding structure 822 provides a channel extending to a surface of a second housing 824 of the second device 802. For example, the second device 802 can be a second mobile phone and the second housing 824 can correspond to the outer case of the second mobile phone. As shown in FIG. 8, the first signal guiding structures 812 and the second signal guiding structures 822 are substantially aligned on either side of the respective first and second housings 814, 824. The alignment minimizes data transmission loss from the first transmitter IC package 806 to the second receiver IC package 818 and from the second transmitter IC package 816 to the first receiver IC package 808.

Figure 9:
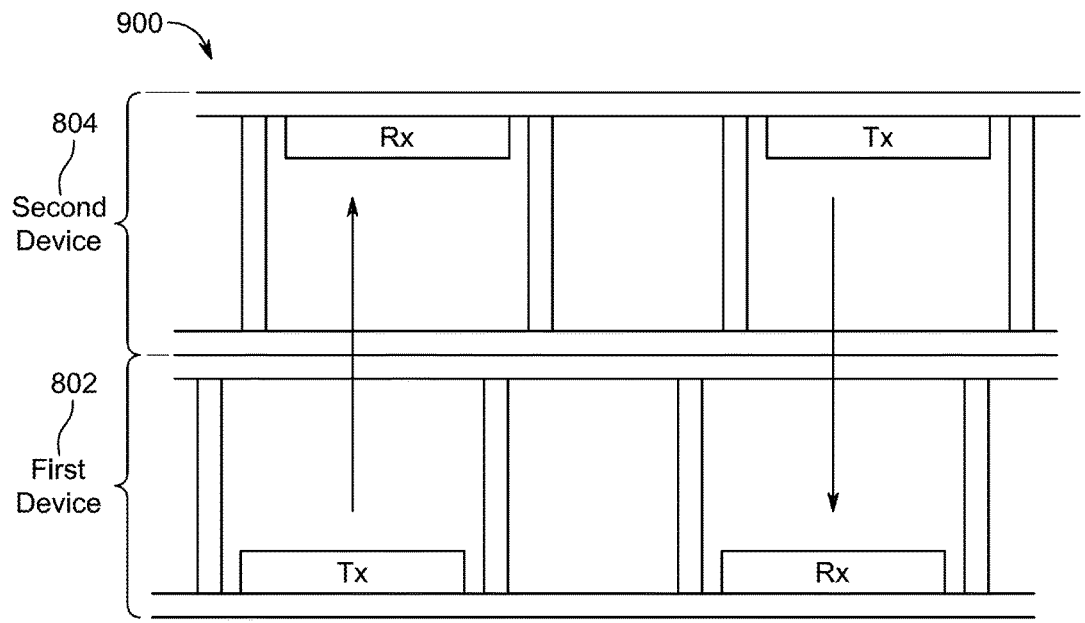
FIG. 9 shows a side view diagram illustrating an example of a misaligned pair of transmitters and receivers, according to an embodiment.

By contrast, FIG. 9 shows a side view diagram 900 illustrating an example of a misaligned pair of transmitters and receivers. In particular, diagram 900 illustrates the portion of the first device 802 and the second device 804 of FIG. 8 where the respective signal guiding structures are not aligned with one another. For example, the first device 802 and second device 804 may both be mobile devices. When placed next to each other to communicate data, the devices may not be aligned perfectly, which may mean that the signal guiding structures are not aligned with one another within a specified tolerance.

For example, the transmitter and receiver IC packages of each device can operate in the EHF band and require a high degree of alignment to prevent signal degradation or loss. In some implementations, the signal guiding structures are preferably aligned within 0.5 mm. Thus, even a small amount of misalignment can result in signal loss between respective transmitters and receivers of the devices. Additionally, in the example shown in FIGS. 8-9, a particular orientation of the first and second devices may be needed to align a respective transmitter with a respective receiver.

Figure 10A:
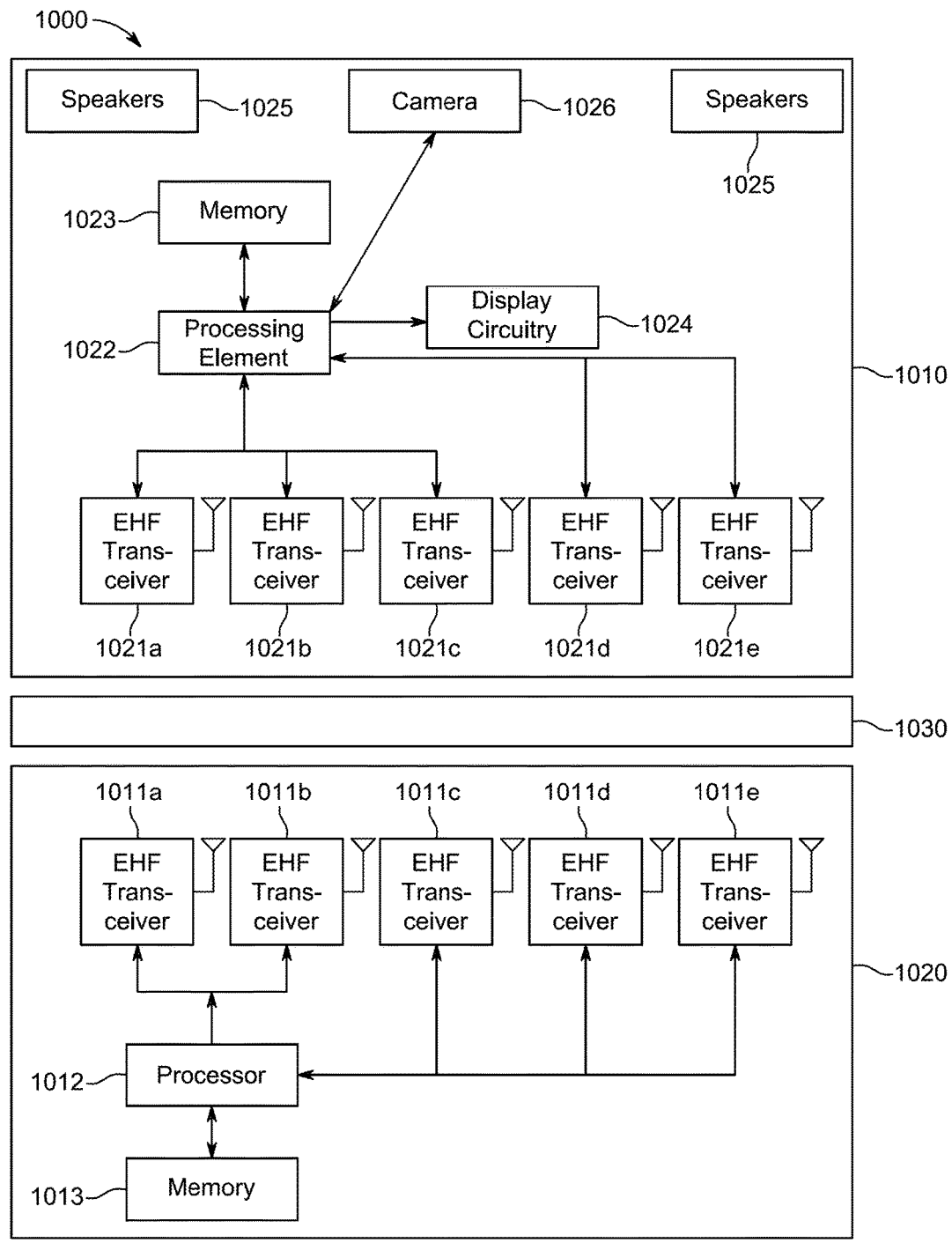
FIG. 10A shows an illustrative schematic diagram of an electronic device, according to some embodiments.

FIG. 10A shows an illustrative schematic diagram of electronic device 1000 according to an embodiment. Device 1000 can include enclosure 1010, enclosure 1020, and hinge 1030. Enclosures 1010 and 1020 can be movably or detachably coupled together via hinge 1030 and can move with respect to each other and/or be detached from each other. Enclosures 1010 and 1020 can each include various circuitries. For example, as shown, enclosure 1010 can include EHF transceivers 1011a-e, processor 1012, memory 1013, and other circuitry (not shown). Enclosure 1020 can include EHF transceivers 121a-e, processing element 1022, memory 1023, display circuitry 1024, speakers 1025, camera 1026, and other circuitry (not shown). In embodiments where device 1000 is a laptop type of device, enclosure 1010 can include the keyboard portion of the laptop and enclosure 1020 can include the display portion of the laptop.

During operation of device 1000, data can be transmitted between enclosures 1010 and 1020 via EHF transceivers 1011a-e and 1021a-e. Each of transceivers 1011a-e (of enclosure 1010) can be close proximity coupled to a respective one of EHF transceivers 1021a-e (of enclosure 1020). For example, EHF transceivers 1011a and 1021a can be contactlessly coupled together, EHF transceivers 1011b and 1021b can be contactlessly coupled together, and so on. Each EHF transceiver pair coupling can provide a contactless data pathway, conduit, or channel. In some embodiments, the data conduits can be one-way (e.g., data flows from enclosure 1010 to enclosure 1020 via a particular conduit) or two-way (e.g., data flows bi-directionally between enclosures 110 and 120 via a particular conduit). In some embodiments, device 1000 can have a predetermined number of dedicated one-way conduits for carrying data from enclosure 1010 to enclosure 1020 and a predetermined number of dedicated one-way conduits for carrying data from enclosure 1020 to enclosure 1010. For example, a dedicated one-way conduit can carry graphics data generated within enclosure 1010 for display on enclosure 1020 and another dedicated one-way conduit can carry image data generated by camera 1026 within enclosure 1020 for use by circuitry contained in enclosure 1010. In other embodiments, device 1000 can include one or more two-way conduits. In yet another embodiment, device 1000 can include a combination of one-way and two-way conduits. As illustrated in FIG. 10A, each of the EHF contactless couplings can be single conduit couplings in which only one data path exists for each coupling. This is merely illustrative, and it is understood that an EHF contactless coupling can include multiple conduits.

Figure 10B:
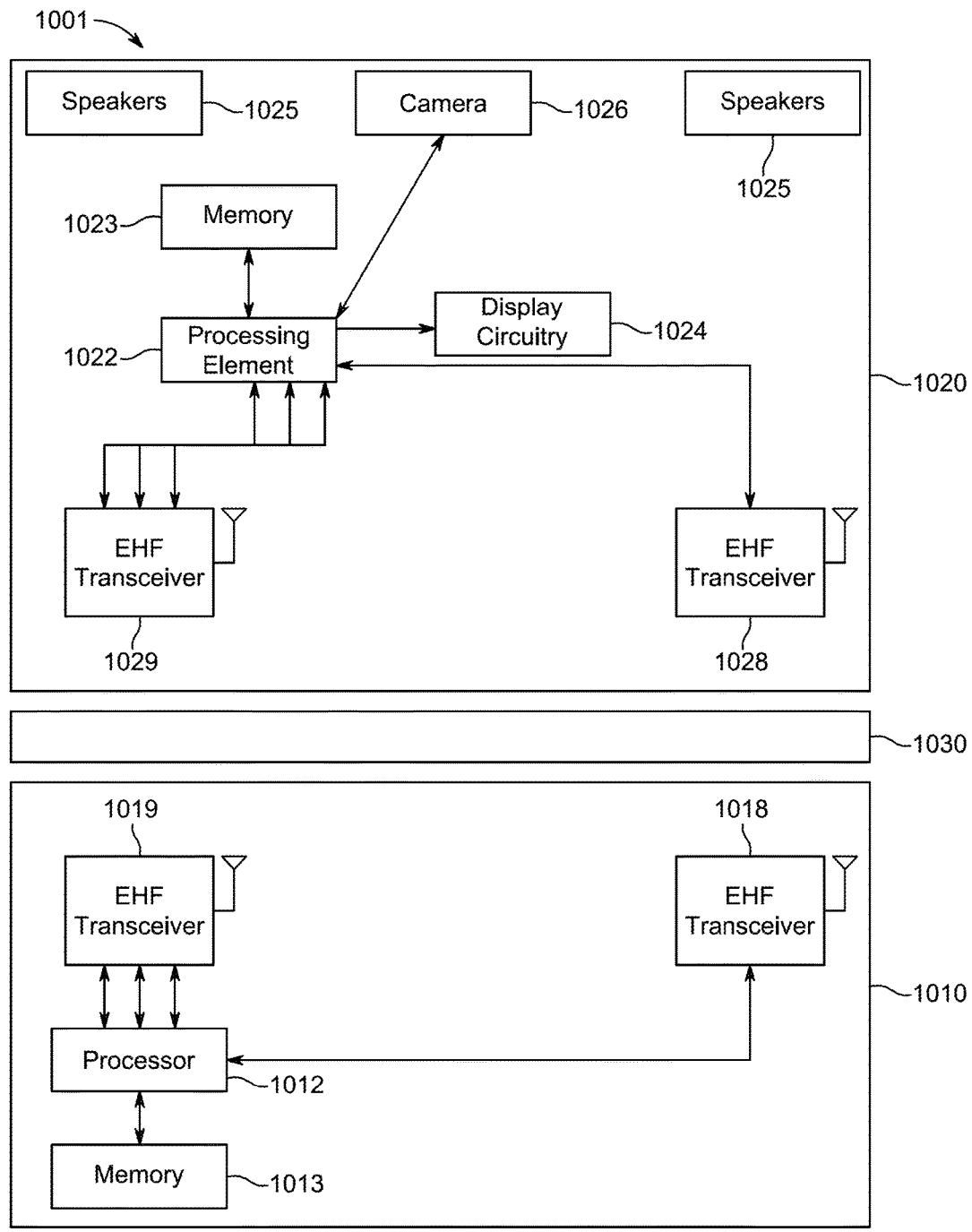
FIG. 10B shows an illustrative schematic diagram of another electronic device, according to some embodiments.

FIG. 10B shows illustrative electronic device 1001 having a multiple conduit EHF contactless coupling. In particular, EHF transceiver 1019 (of enclosure 1010) can form a multiple conduit contactless coupling with EHF transceiver 1029 (of enclosure 1020). A multiple conduit contactless coupling can transmit a greater amount of data than a single conduit contactless coupling. Device 1001 can also include EHF transceivers 1018 and 1028, which can form a single conduit contactless coupling.

An advantage of using the EHF contactless couplings for enabling data transfer between enclosures is that this contactless coupling replaces physical mediums conventionally used to transfer data. Such physical mediums can include, for example, wires, flexible printed circuit boards, and connectors. Since physical mediums can be bent or subject to various forces during use of conventional devices constructed with such mediums (e.g., repeated opening and closing of a laptop), the physical mediums can fail. In a laptop example, a failed physical medium can render the display useless when the pathway that carries display data is severed. The EHF contactless couplings used in embodiments discussed herein are not subject to the same mechanical failure issues because the data is transmitted via close proximity coupling. However, the absence of a physical transmission medium can introduce a different type of connectivity issue—an issue for ensuring that data is contactlessly transmitted and received regardless of the position of one enclosure with respect to the other.

Hinge 1030 can enable enclosures 1010 and 1020 to move in different directions with respect to each other, while simultaneously serving as a conduit for EHF signal transmission between enclosures 1010 and 1020. In some embodiments, hinge 1030 may enable enclosure 1010 to rotate with respect to enclosure 1020 in a clamshell like movement that ranges anywhere from 0 to 360 degrees of rotation. Although hinge 1030 is shown generically as a single hinge, hinge 1030 may encompass multiple hinge assemblies, each of which serve as EHF signal conduits for a particular coupled pair of EHF transceivers. For example, in FIG. 10A, separate hinge assemblies may be associated with each of coupled pairs 111a/121a, 111b/121b, 111c/121c, 111d/121d, and 111e/121e. In FIG. 10B, separate hinge assemblies may be associated with each of coupled pairs 118/128 and 119/129. FIGS. 11-26, discussed below, show several different hinge assemblies according to various embodiments.

Figure 11:
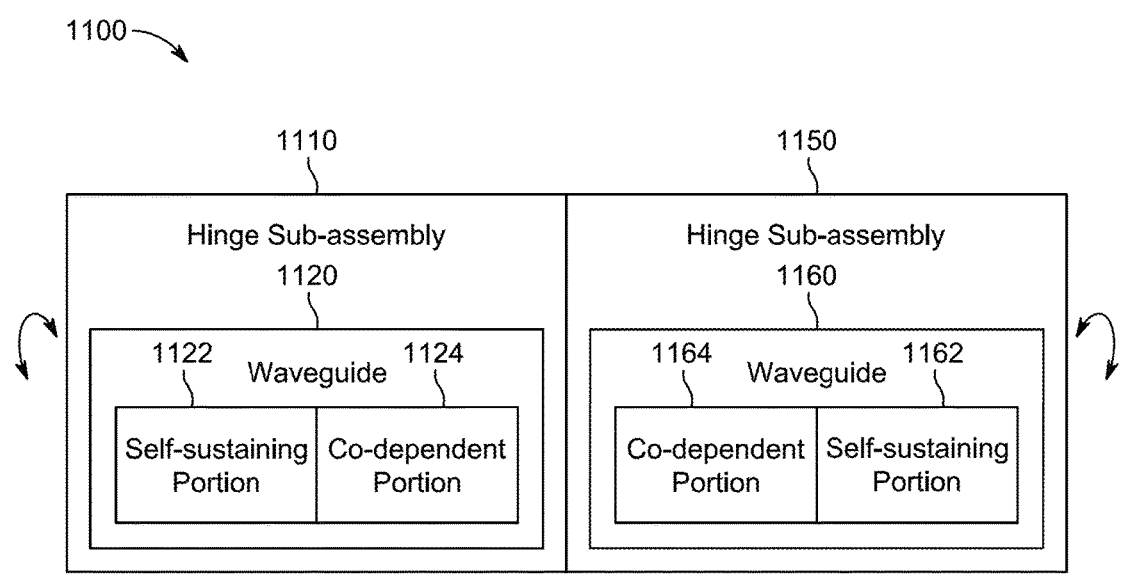
FIG. 11 shows an illustrative hinge assembly according to some embodiments.

FIG. 11 shows illustrative hinge assembly 1100, according to an embodiment. Hinge assembly 1100 may include hinge subassemblies 1110 and 1150 that rotate with respect to each other via a common axis (not shown). This rotation may be referred to herein as angular rotation. Hinge subassembly 1110 can include waveguide 1120, which may include self-sustaining signal propagation portion 1122 and co-dependent signal propagation portion 1124. Hinge subassembly 1150 can include waveguide 1160, which may include self-sustaining signal propagation portion 1162 and co-dependent signal propagation portion 1164. Self-sustaining signal propagation portions 1122 and 1162 are dimensioned to permit a signal (e.g., an EHF signal) to pass through. Co-dependent signal portions 1124 and 1164 are dimensioned such that a signal (e.g., an EHF signal) cannot pass through portion 1124 or portion 1164 unless portions 1124 and 1164 are in contact and overlapping each other. Thus, portion 1124 or portion 1164, when taken independently, is not dimensioned to permit the signal to pass through. However, when portions 1124 and 1164 are in direct contact with each other and overlap, a signal propagation coupling is formed that enables the signal to pass from waveguide 1120 to waveguide 1160. The signal propagation coupling may exist between portions 1124 and 1164 when subassemblies 1110 and 1150 are positioned in a first range of angular rotation, such that portions 1124 and 1164 are in direct contact with each other to form the propagation coupling between waveguides 1120 and 1160 to enable signals to propagate through hinge assembly 1100. When subassemblies 1110 and 1150 are positioned in a second range of angular rotation, co-dependent signal propagation portions 1124 and 1164 are not in direct contact with each other and signals are not able to propagate through hinge assembly 1100. The first range of angular rotation does not overlap with the second range of angular rotation.

When co-dependent signal propagation portions 1124 and 1164 are in direct contact with each other, signals may propagate through hinge assembly 1100 by entering subassembly 1110 via self-sustaining signal propagation portion 1122, propagate through the propagation coupling, and exit subassembly 1150 via self-sustaining signal propagation portion 1162. When co-dependent signal propagation portions 1124 and 1164 are in direct contact with each other, a combined cross-sectional area of co-dependent signal propagation portions 1124 and 1164 in direct contact with each other is sufficient to enable signal propagation.

Each of subassemblies 1110 and 1150 may include additional members (not shown) that are constructed to at least partially enclose their respective waveguides 1120 and 1150.

For example, the members may contain the signals within the waveguides using selective placement of conductive material.

The hinge assemblies according to various embodiments are described as being used primarily in connection with EHF signals. However, the hinge assemblies can be used in connection with radio frequency signals other than EHF signals.

Figure 12A:
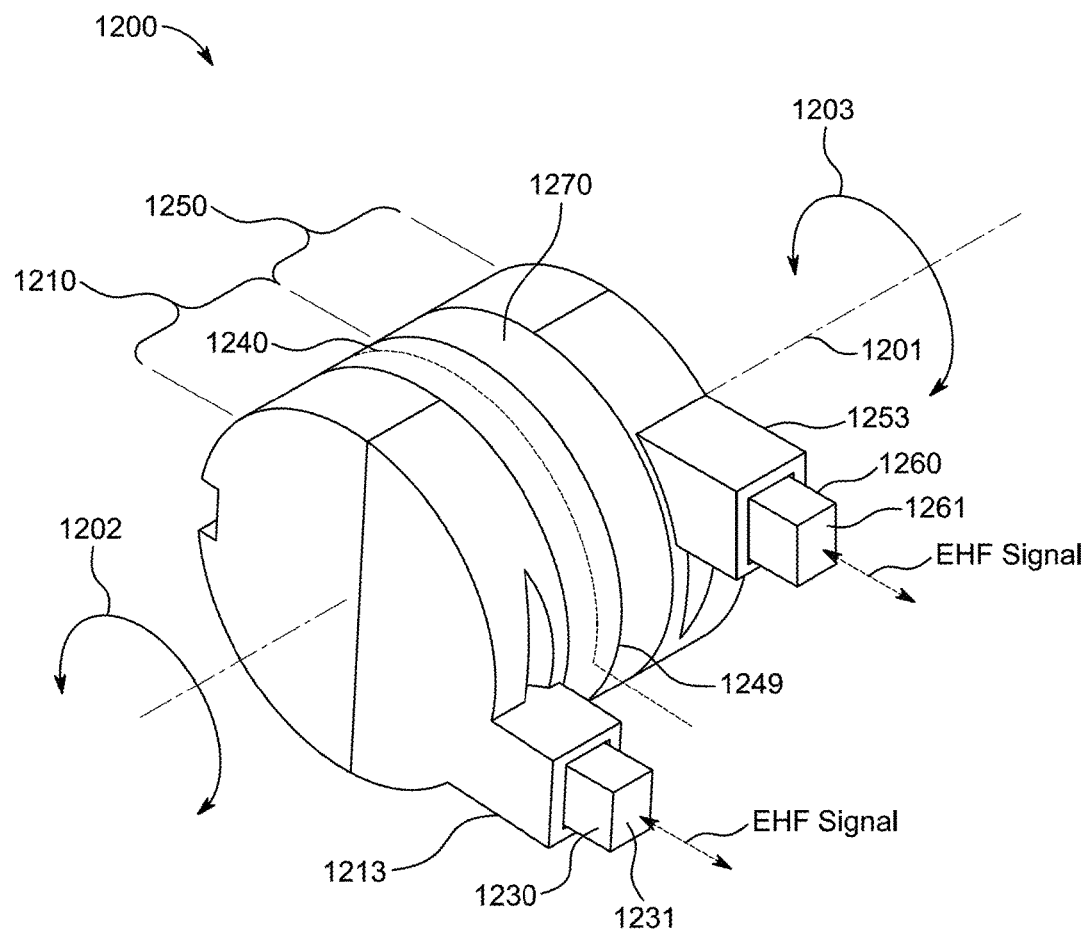
FIG. 12A shows an illustrative hinge assembly according to an embodiment.
Figure 14A:
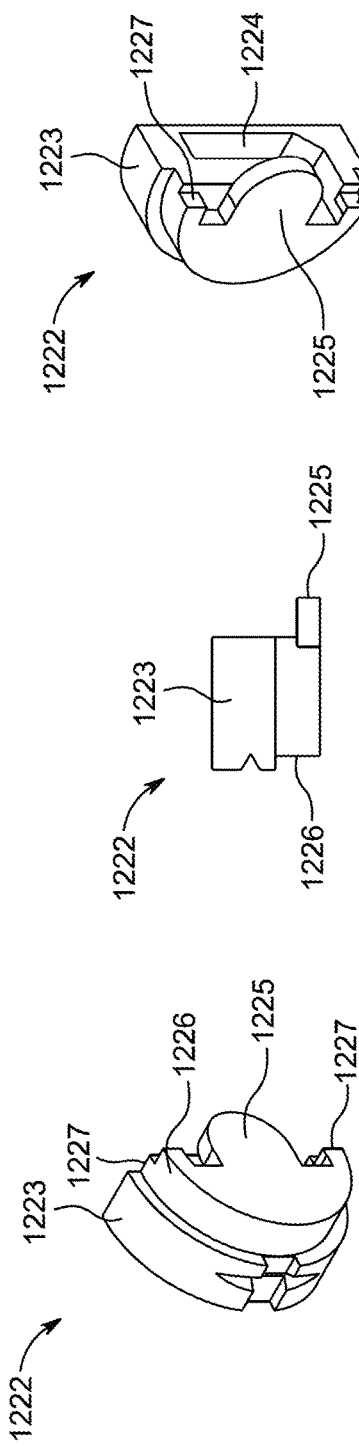
FIGS. 14A-14E show different views of a second member according to an embodiment.
Figure 14B:
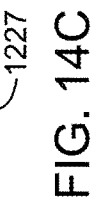
Figure 14C:
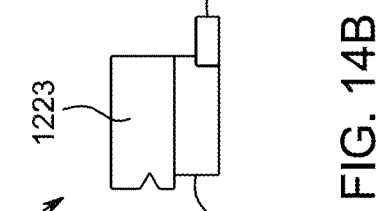
Figure 14D:
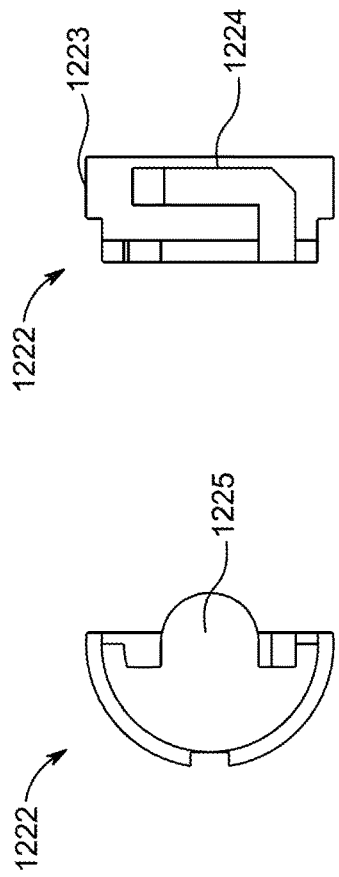
Figure 14E:
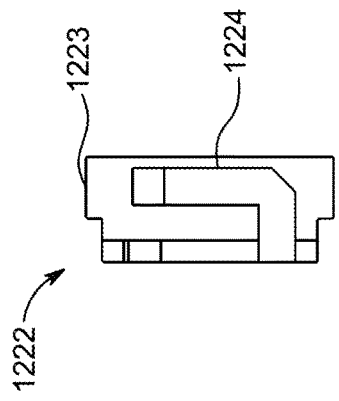

The discussion of FIGS. 12A-21C relates to a rotating hinge assembly 1200 according to an embodiment. FIGS. 12A-21C will be referred to collectively herein for the discussion of hinge assembly 1200. Hinge assembly 1200 can include two subassemblies subassembly 1210 and subassembly 1250, that are collinearly aligned with axis 1201 and mated together at interface 1249. Although not shown in FIGS. 12A-21C, multiple hinge assemblies can be combined to provide multiple contactless paths. Each subassembly 1210 and 1250 may rotate independent of the other or only one subassembly may rotate with respect to the other. For example, both subassemblies 1210 and 1250 may rotate in clockwise and counter clockwise directions 1202 and 1203. In another example, subassembly 1210 may be fixed in position and subassembly 1250 can rotate in clockwise and counter clockwise directions 1203 with respect to subassembly 1210. In this embodiment, subassemblies 1210 and 1250 may rotate between 0 and 360 degrees, or between 0 and 270 degrees, or between 0 and 180 degrees, but the effective contactless path may only exist between 0 and 180 degrees. It should be appreciated that in other embodiments, different subassembly designs can permit contactless paths that exist, for example, between 0 and 270 degrees. Additional subassembly designs may permit contactless paths to exist at ranges exceeding 270 degrees, such as between 0 and 300 degrees, between 0 and 310 degrees, between 0 and 360 degrees, however such designs may only be partially effective in transmitting signals beyond 270 degrees of rotation. In other embodiments, there may be physical limitations that limit the rotation angle between subassemblies 1210 and 1250. For example, the rotation angle can be limited to a range between 0 and 360 degrees, such as 0 and 180 degrees, 0 and 270 degrees, or 0 and 90 degrees. FIG. 12A shows, for example, that subassemblies 1210 and 1250 are oriented at 0 degrees with respect to each other, whereas FIG. 20A shows that subassemblies 1210 and 1250 are oriented at 90 degrees with respect to each other, and whereas FIG. 19A shows that subassemblies 1210 and 1250 are oriented at 180 degrees with respect to each other. It should be appreciated that although sub-assemblies 1210 and 1250 are identical, they do not necessarily have to be the same.

Subassembly 1210 may include first member 1212, second member 1222, waveguide 1230, and coupling member 1240. Subassembly 1250 may include a first member and a second member, waveguide 1260, and coupling member 1270. In some embodiments, the first and second member, waveguide 1260, and coupling member 1270 may be same as first member 1212, second member 1222, waveguide 1230, and coupling member 1240, such that when subassemblies 1210 and 1250 are coupled together, subassembly 1250 is identical to subassembly 1210, but flipped to face in the opposite direction. First and second members 1212 and 1222 are constructed to interface with each other and retain waveguide 1230 in place within interfaced members 1212 and 1222, as shown in FIGS. 12B-12D. Coupling member 1240 may couple first and second members 1212 and 1222 together after members 1212 and 1222 have been mated together with waveguide 1230 contained therein, as shown in FIGS. 12B-12D. First and second members 1212 and 1222 may be constructed from a metal material or a metalized plastic material. Waveguide 1230 may be constructed from a dielectric material such as plastic, foam, air, or other material suitable for efficiently transmitting EHF signals. In some embodiments, waveguide 1230 may be a dielectric substrate that is covered, on some surfaces, with a metallization layer. For example, in FIGS. 15A-15D, all surfaces, except for surfaces 1231 and 1237, may be covered with metal. In other words, any surface through which signals must pass through are not covered with a metal or metalized. Thus waveguide interfaces such as waveguide interface region 1231 and waveguide interface portion 1237 are not covered with metal or metalized. Coupling member 1240 may be constructed from any suitable material such as a plastic, metal, or ferrous material. In one embodiment, coupling member 1240 may be a magnetic ring that is designed to magnetically couple subassembly 1210 to a magnetic ring associated with subassembly 1250. This is shown, for example, in FIG. 12 where coupling member 1240 may be magnetically coupled to coupling member 1270.

An EHF coupling may exist between subassemblies 1210 and 1250 depending on the orientation of subassembly 1210 relative to subassembly 1250. It is through this EHF coupling that EHF signals may pass from subassembly 1210 to subassembly 1250, or vice versa. In particular, this coupling refers to the EHF coupling existing between waveguide 1230 and waveguide 1260. The EHF signals may travel in a direction that is along the arc of the overlap between waveguide 1230 and waveguide 1260. It should be appreciated, however, the EHF propagation path through hinge assembly 1200 may take a multi-contoured path as EHF signals make their way through a first waveguide, pass from that waveguide to a second waveguide, and then pass through the second waveguide. For example, as will be explained below, the EHF propagation may turn one or more corners, follow a circular path, and pass from one waveguide to another. The surfaces of the waveguide 1230 and waveguide 1260 that are facing one another may not be covered with a metallization layer in order to provide a coupling path between waveguide 1230 and waveguide 1260.

FIGS. 13A-13E show different views of first member 1212. As shown, first member 1212 can include neck portion 1213 (though which waveguide interface region 1231 passes), waveguide retention region 1214 (which provides a recess into which waveguide 1230 can be retained in place within subassembly 1210), waveguide engagement region 1215 (which provides another recess in which waveguide 1230 is contained within subassembly 1210), coupling retainer region 1216 (that may provide a stop for receiving and retaining coupling member 1240), and interfacing portion 1217 (that may be designed to interlock with counterpart interfacing portions 1227 of second member 1222). The dimensions and shape of neck portion 1213, waveguide retention region 1214, and waveguide engagement region 1215 may be configured to the shape of waveguide 1230. For example, neck portion 1213 may be constructed to accept extension portion 1232 of waveguide 1230, waveguide retention region 1214 may be constructed to conform to the transition portion 1234 of waveguide 1230, and waveguide engagement region 1215 may be constructed to conform to circular portion 1236 of waveguide 1230 (where portions 1232, 1234, and 1236 are illustrated in FIG. 15A-15E). Coupling retainer region 1216 is shown as a half circular shape that is stepped down in size relative to an outer dimension of first member 1212.

FIGS. 14A-14E show different views of second member 1222. As shown, first member 1222 can include main body portion 1223, waveguide retention region 1224 (which provides a recess into which waveguide 1230 can be retained in place within subassembly 1210), waveguide engagement region 1225 (which interfaces with circular portion 1236 of waveguide 1230), coupling retainer region 1226 (that may provide a stop for receiving and retaining coupling member 1240), and interfacing portion 1227 (that may be designed to interlock with counterpart interfacing portions 1217 of first member 1212). The dimensions and shape of waveguide retention region 1224 and waveguide engagement region 1225 may be configured to the shape of waveguide 1230. For example, waveguide retention region 1224 may be constructed to conform to transition portion 1234 of waveguide 1230 and waveguide engagement region 1225 may be constructed to conform to the inside circular portion 1236 of waveguide 1230. Coupling retainer region 1226 is shown as a half circular shape that is stepped down in size relative to an outer dimension of main body portion member 1223.

In some embodiments, waveguide 1230 may not be metalized. In such embodiments, members 1212 and 1222 may be metalized to provide the desired EHF containment. For example, the surfaces of members 1212 and 1222 that contact waveguide 1230 may be metalized. In some embodiments, members 1212 and 1222 may be constructed entirely out of a conductive material.

In an alternative embodiment in which no waveguide is contained within subassembly 1210 or subassembly 1250, the waveguide retention regions (e.g., regions 1214 and 1224) and the waveguide engagement regions (e.g., regions 1215 and 1225) may be repurposed as air-filled waveguide channels that do not include a plastic waveguide. Thus, the empty space within subassembly 1210 or 1250 that could retain a plastic waveguide may be left devoid of such a waveguide so that air can serve as the transmission medium of the EHF signals.

The general shape of the outer dimensions of subassembly 1210 and 1250 may be cylindrical in nature, though it should be appreciated that the outer dimension of subassemblies 1210 and 1250 may take any suitable shape so long as they are still able to rotate about the same axis 1201. When first and second members 1212 and 1222 are connected together, the half circular shape retainer region 1216 may form a fully circular retainer region with coupling retainer region 1226. This fully circular retainer region may form the basis for enabling subassembly 1210 to rotate about axis 1201.

FIGS. 15A-15E show different views of waveguide 1230. As shown, waveguide 1230 can include extension portion 1232, transition portion 1234, and circular portion 1236. Extension portion 1232 may include waveguide interface region 1231 through which EHF signals may be transmitted to or received from a CCU (not shown). Circular portion 1236 may include waveguide interface portion 1237 through which EHF signals may be transmitted to or received from waveguide interface portion 1267 of circular portion 1266 (of subassembly 1250). Transition portion 1234 may serve as a transition region between extension portion 1232 and circular portion 1236. As shown in FIG. 15A, for example, portion 1234 transitions waveguide 1230 from an x-direction to a y-direction and then to a z-direction. Thus, signals entering subassembly 1210 may enter waveguide interface region 1231, propagate through extension portion 1232 and transition portion 1234, propagate through circular portion 1236 when waveguide interface portion 1237 overlaps with waveguide interface portion 1267 (of subassembly 1250) and exit subassembly 1250 via waveguide interface region 1261.

FIGS. 16A-16E show different illustrative views of an assembled subassembly 1210. During assembly of subassembly 1210, waveguide 1230 may be inserted into first member 1212 such that extension portion 1232 enters and passes through neck portion 1213. When waveguide 1230 is fully inserted into first member 1212, transition portion 1234 may be retained in waveguide retention region 1214, and circular portion 1236 may abut against waveguide engagement region 1215. When second member 1222 is mated with first member 1212, transition portion 1234 may be nestled into waveguide retaining region 1224 and the curved inner surface of circular portion 1236 may abut against waveguide engagement region 1225. The recesses within first and second members 1212 and 1222 may be such that their mating faces fit relatively flush against each other despite having waveguide 1230 contained therein. After first and second members 1212 and 1222 are mated together, coupling member 1240 may be positioned over coupling retainer regions 1216 and 1226 to hold them in place. It should be appreciated that in some embodiments, coupling member 1240 need not necessarily be used to couple first and second members 1212 and 1222 together, but may serve as coupling member for coupling subassembly 1210 to subassembly 1250. In such embodiments, interfacing regions 1217 and 1227 may interlock with each other to couple first and second members 1212 and 1222 together and to secure waveguide 1230 in place.

EHF signals may enter or exit each of subassemblies 1210 and 1250 via their respective waveguides 1230 and 1260. In particular, EHF signals may enter or exit via waveguide interface regions 1231 and 1261. Waveguide interface regions 1231 and 1261 may extend out from subassemblies 1210 and 1250 and may be constructed to interface with a launch structure (not shown) associated with a CCU or EHF transceiver. Launch structures can control the EHF interface impedance between a CCU and the waveguide, and provide design flexibility routing EHF signals between a subassembly of hinge 1200 and a CCU (not shown). The launch structures may be designed to interface with neck portions 1213 or 1253 to prevent EHF leakage.

Figure 17A:
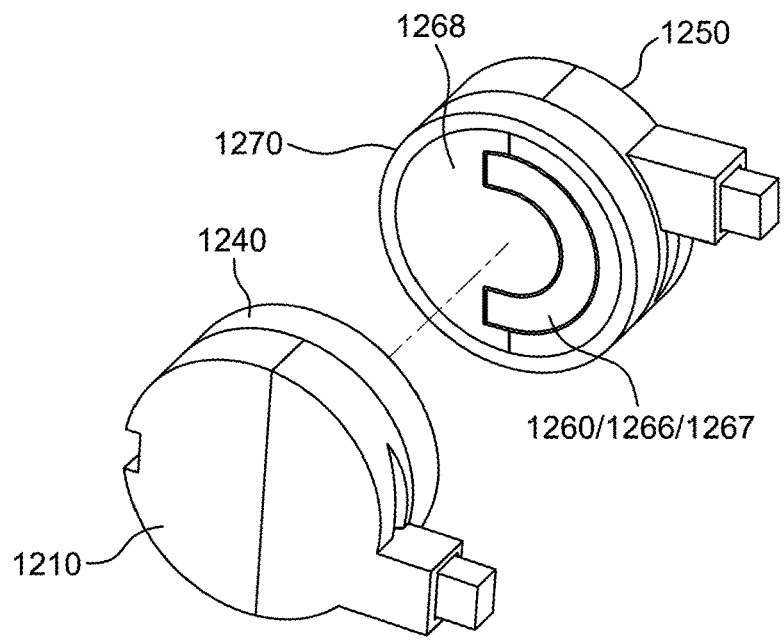
FIGS. 17A and 17B show different views of subassemblies in close proximity of each other, but not coupled together, according to an embodiment.
Figure 17B:
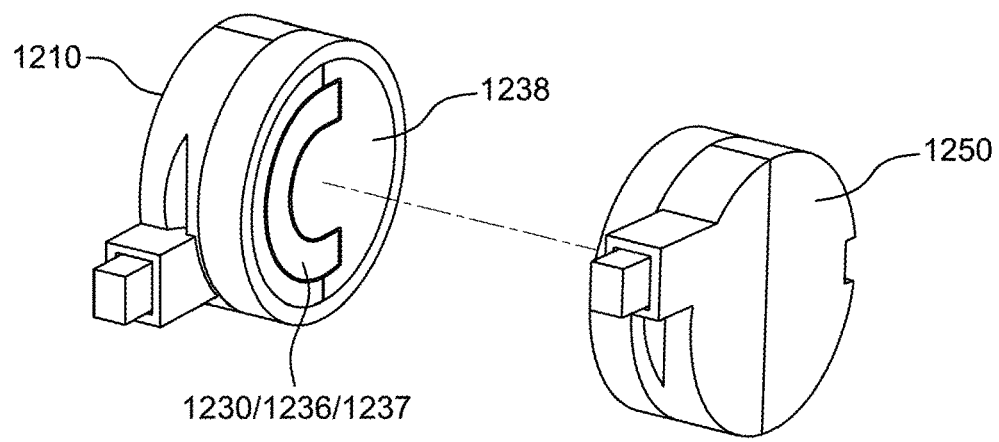

FIGS. 17A and 17B show different views of subassemblies 1210 and 1250 in close proximity of each other, but not coupled together. Subassemblies 1210 and 1250 may be coupled together via coupling members 1240 and 1270. As discussed above, coupling members 1240 and 1270 may be ring magnets. In some embodiments, coupling members 1240 and 1270 may be constructed to provide a male/female fit such that one coupling member may slot into another coupling member yet retain their ability to rotate about a common axis. In other embodiments, external structures (not shown) such as device housings may couple subassemblies 1210 and 1250 together. For example, a first housing may contain subassembly 1210 and a second housing may contain subassembly 1250. The first and second housings may be hinged to move with respect to one another and couple subassemblies 1210 and 1250 together throughout the hinged movement.

Waveguide 1230 can include a self-sustaining EHF signal propagation portion and a co-dependent EHF signal propagation portion. The self-sustaining EHF signal propagation portion may be represented by extension portion 1232 and transition portion 1234, and co-dependent EHF signal propagation portion may be represented by circular portion 1236. Extension portion 1232 and transition portion 1234 may be able to self-sustain propagation of EHF signals based on their cross-sectional area. That is, the cross-sectional area of extension portion 1232 and transition portion 1234 is such that EHF signal energy is able to propagate through those portions of waveguide 1230 independent of any other structure. Circular portion 1236 may be unable to independently self-sustain propagation of EHF signals due to its cross-sectional area. That is, the cross-sectional area of circular portion 1236, when considered independent of any other structure (e.g., circular portion 1266), may be too small to enable propagation of the EHF signal energy. However, when circular portion 1236 makes contact with circular portion 1266, a cross-sectional area sufficient to provide an EHF propagation coupling results and allows EHF signals to pass from one waveguide (e.g., waveguide 1230) to another waveguide (e.g., waveguide 1260). When circular portions 1236 and 1266 are in direct contact with each other (or overlap each other), the combination of their cross-sectional areas is sufficient to enable EHF signal propagation. Thus, only the overlapping portions of 1236 and 1266 permit signal propagation.

Regardless of how subassemblies 1210 and 1250 are coupled together, surface 1238 is in contact with surface 1268. Surfaces 1238 and 1268 may be constructed from metal or metalized. Waveguide interface portion 1237 of circular portion 1236 may be coplanar with surface 1238 and waveguide interface portion 1267 of circular portion 1266 may be coplanar with surface 1268. As a result, and depending on the orientation of subassembly 1210 with respect to subassembly 1250, waveguide interface portion 1237 of circular portion 1236 may be in direct contact with waveguide interface portion 1267 of circular portion 1266. When waveguide interface portion 1237 is directly interfaced (or overlapping) with waveguide interface portion 1267, contactless signals can pass from waveguide 1230 to waveguide 1260 or vice versa. When waveguide interface portion 1237 is not directly interfaced (or overlapping) with waveguide interface portion 1267, contactless signals cannot pass from waveguide 1230 to waveguide 1260 or vice versa.

In use, hinge assembly 1200 enables EHF signals to enter a first waveguide (e.g., waveguide 1230 via interface 1231), pass through the first waveguide to a second waveguide (e.g., waveguide 1260 via interfaces 1237 and 1267), and out of the second waveguide (e.g., via interface 1261). The EHF signals may only be able to pass through hinge 1200 when waveguide interface portion 1237 is directly interfaced (or overlapping) with waveguide interface portion 1267. When waveguide interface portion 1237 is overlapped with waveguide interface portion 1267, the cross-sectional area of the overlapping interface portions 1237 and 1267 is of sufficient size to enable EHF signal propagation. But for the overlap of interface portions 1237 and 1267, the cross-sectional area of circular portions 1236 and 1266 (taken independently) are not sufficient to enable EHF signal propagation.

When waveguide interface portions 1237 and 1267 overlap, and independent of the rotation angle between subassemblies 1210 and 1250 (so long as the overlap exists), a constant real impedance/loading exists among waveguides 1230 and 1260. The establishment of the constant real impedance/loading between both waveguides enables the EHF energy to propagate through hinge assembly 1200 independent of the rotation angle. When the subassemblies are moved beyond a certain rotation angle such that there is no overlap between waveguides, the constant real impedance/loading is no longer present.

Figure 18B:
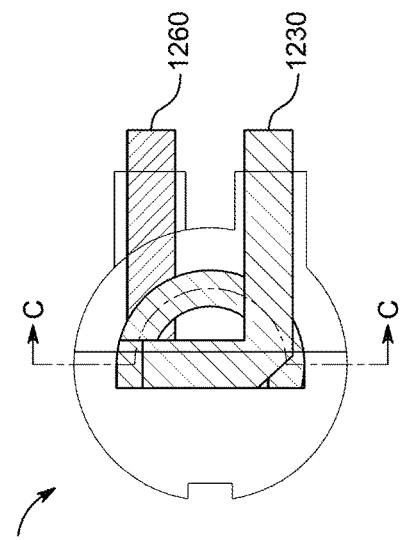
FIGS. 18A-18C, FIGS. 19A and 19B FIGS. 20A and 20B, and FIGS. 21A-21C show different perspective, side and cross-sectional views are shown of a hinge assembly arranged in different angular rotations according to various embodiments.
Figure 18C:
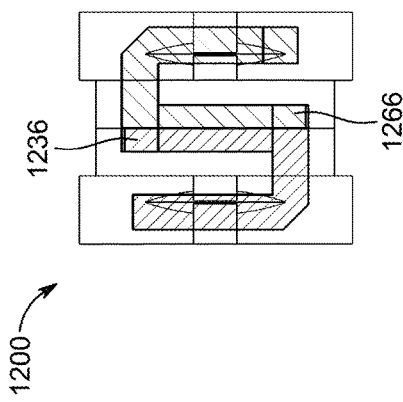
Figure 18A:
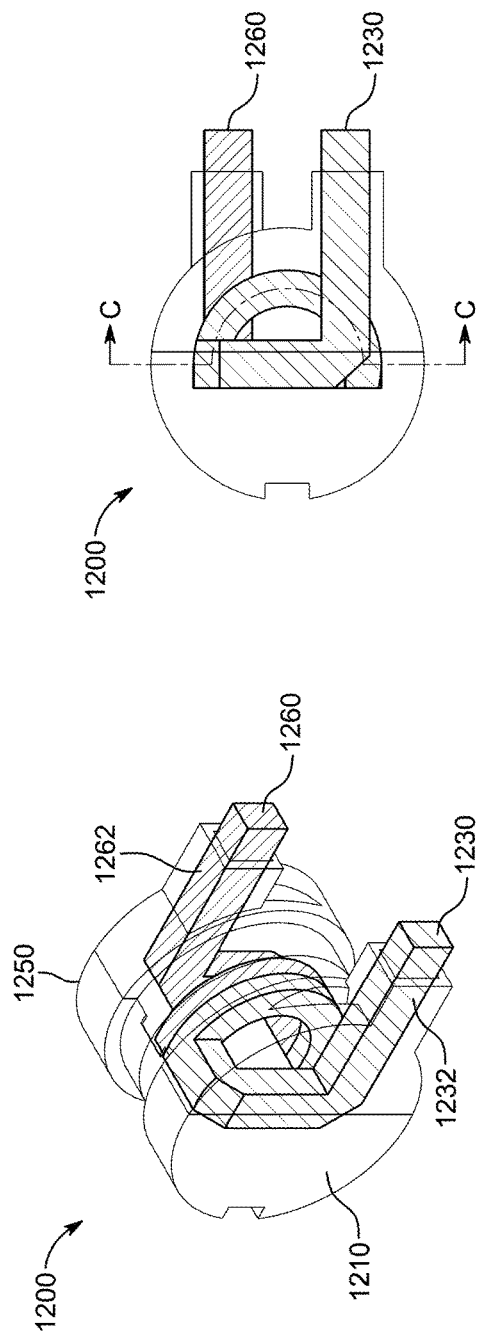

Referring now to FIGS. 18A-18C through 21A-21C, different perspective, side and cross-sectional views are shown of hinge assembly 1200, with particular emphasis on waveguides 1230 and 1260, when subassemblies 1210 and 1250 are in different angular rotations. Coupling members 1240 and 1270 have been removed to avoid overcrowding the drawings. FIGS. 18A-18C show hinge assembly 1200 in an illustrative 0 degree angular rotation in which extension portions 1232 and 1262 are pointing in the same direction. FIG. 18C shows an illustrative cross-sectional view taken along line C-C of FIG. 18B, and shows that circular portions 1236 and 1266 are equally positioned over each other. Thus, in this orientation, EHF signals may propagate through hinge assembly 1200.

Figure 19B:
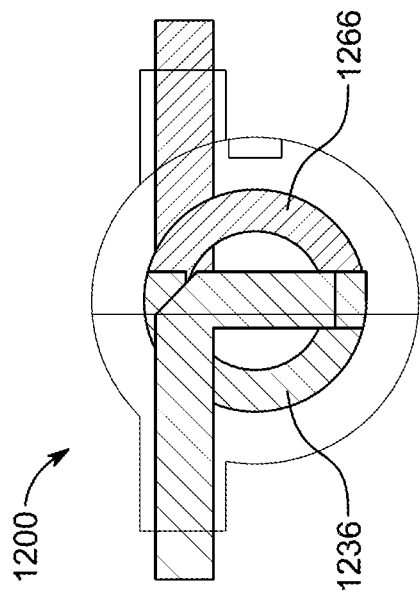
Figure 19A:
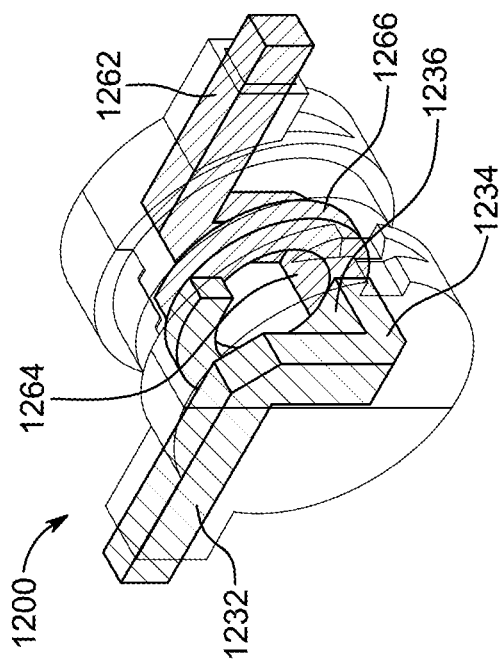

FIGS. 19A-19B show hinge assembly 1200 in an illustrative 180 degree angular rotation in which extension portions 1232 and 1262 are pointing in opposite directions. In this orientation, the combined waveguides 1230 and 1260 exhibit sufficient cross-section area where circular portions 1236 and 1266 form extensions of their respective transition portions 1234 and 1264 (shown on the bottom of the FIGS.) to enable EHF signal propagation through hinge assembly 1200. If hinge assembly 1200 were to be over rotated past 180 degrees, some of circular portions 1236 and 1266 may overlap, but there may not be a continuous overlap such that the co-dependent overlap of portions 1236 and 1266 is broken.

Figure 20B:
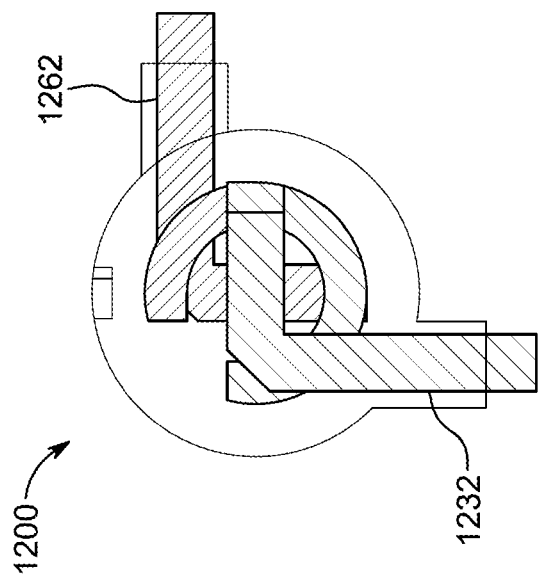
Figure 20A:
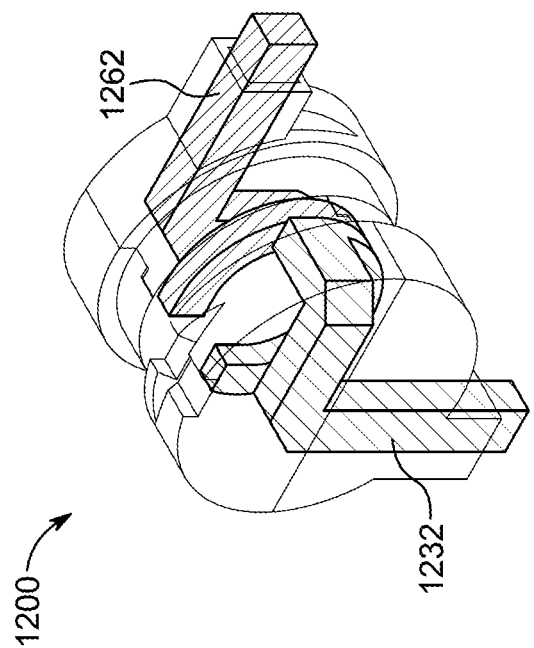

FIGS. 20A-20B show hinge assembly 1200 in an illustrative 90 degree angular rotation in which extension portion 1232 is pointing −90 degrees relative to extension portion 1262. In this orientation, the combined waveguides 1230 and 1260 overlap approximately half of each other. Thus, in this orientation, EHF signals may propagate through hinge assembly 1200.

Figure 21A:
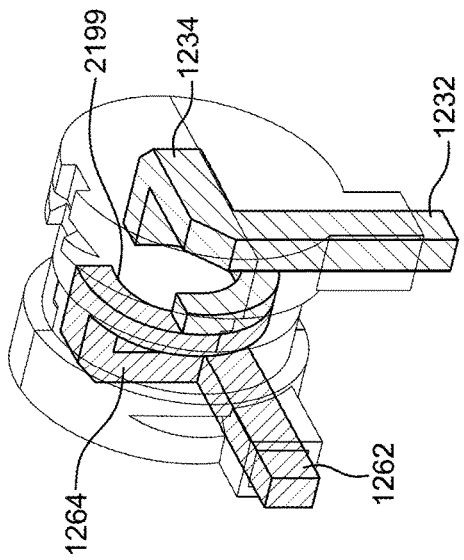
Figure 21B:
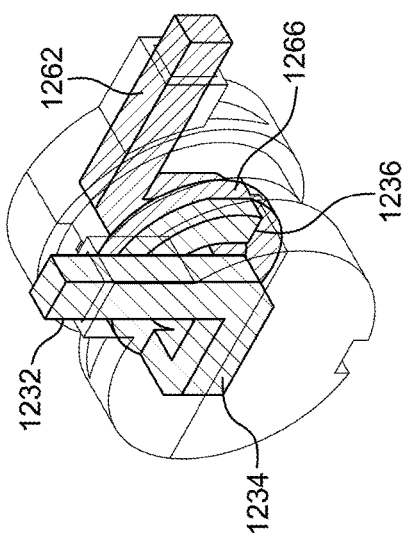
Figure 21C:
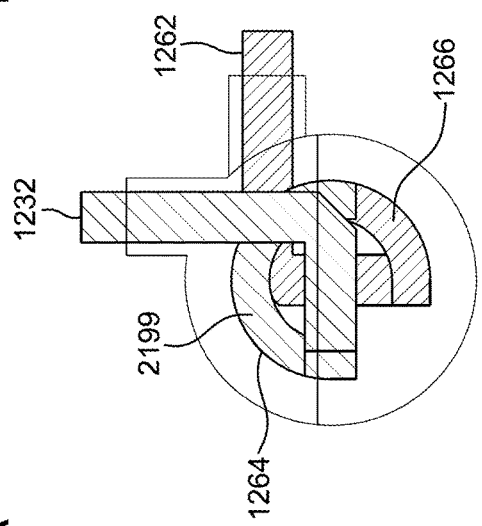

FIGS. 21A-21C show hinge assembly 1200 in an illustrative 270 degree angular rotation in which extension portion 1232 is pointing +90 degrees relative to extension portion 1262. Hinge assembly 1200 is designed for 180 degree rotation, so at 270 degrees, waveguides 1230 and 1260 do not overlap each other at regions 2199. Thus, in this orientation, EHF signals may not propagate through hinge assembly 1200.

Referring now to FIGS. 22A-22D, the propagation principles of operation of a hinge assembly according to embodiments discussed here are shown and discussed. FIGS. 22A-22D show generic representations of the cylindrical structure of both subassemblies, but shows with more particularity the waveguide of each subassembly and the signal propagation energy through one or both waveguides depending on the angular rotation of subassembly 2210 with respect to subassembly 2250. FIG. 22A shows hinge 2200 in an illustrative 0 degree angular rotation. As can be seen, circular portions 2236 and 2276 overlap and EHF signal energy is shown propagating from waveguide 2230 to waveguide 2270. FIG. 22B shows hinge 2200 in an illustrative 50 degree angular rotation. As can be seen, circular portions 2236 and 2276 overlap and EHF signal energy is shown propagating from waveguide 2230 to waveguide 2270. FIG. 22C shows hinge 2200 in an illustrative 180 degree angular rotation. As can be seen, circular portions 2236 and 2276 overlap and EHF signal energy is shown propagating from waveguide 2230 to waveguide 2260. FIG. 22D shows hinge 2200 in an illustrative 240 degree angular rotation. As can be seen, circular portions 2236 and 2276 do not overlap and EHF signal energy is shown entering extension portion 2232 of waveguide 2230, but fails to further propagate into circular portion 2236.

Figure 23A:
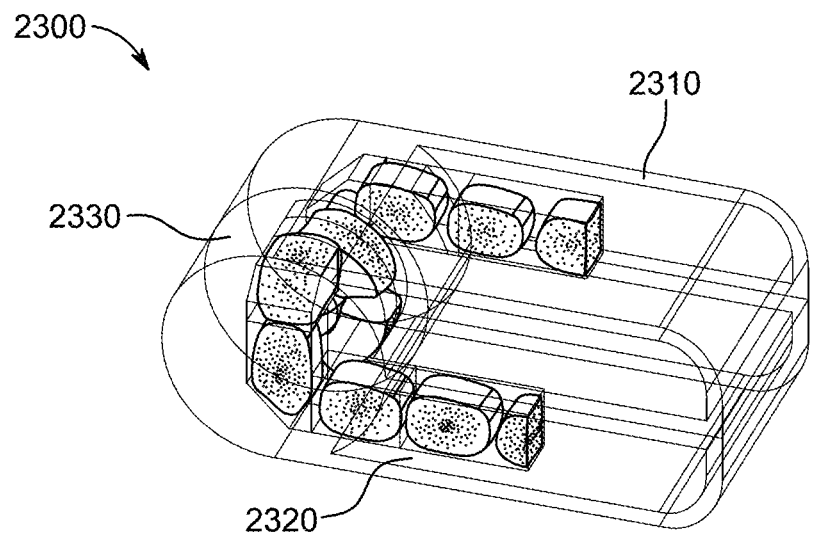
FIGS. 23A-23C show an illustrative clamshell hinge according to an embodiment.
Figure 23B:
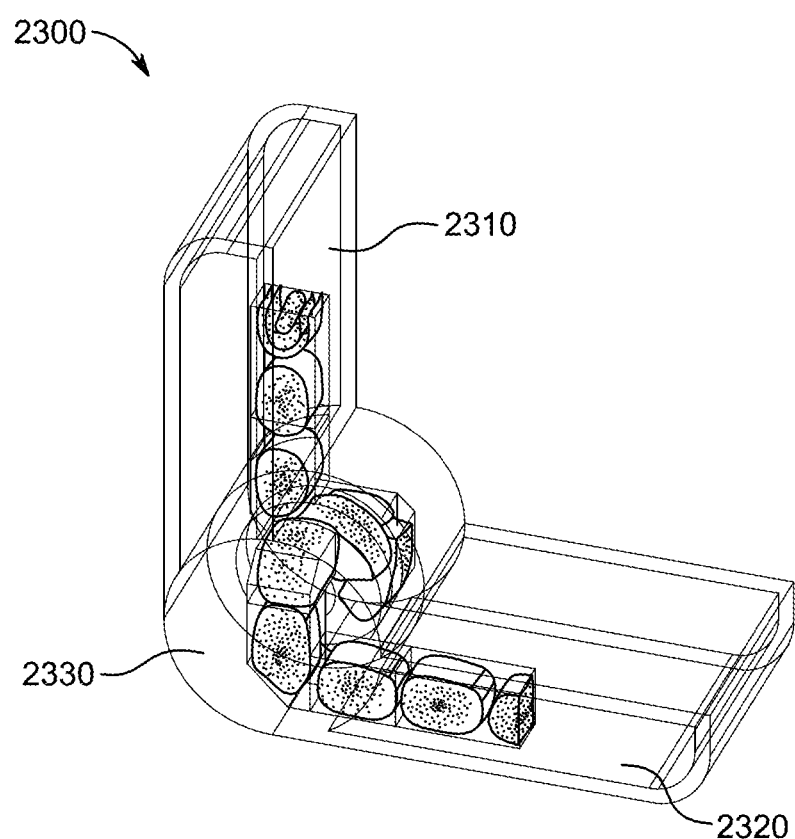
Figure 23C:
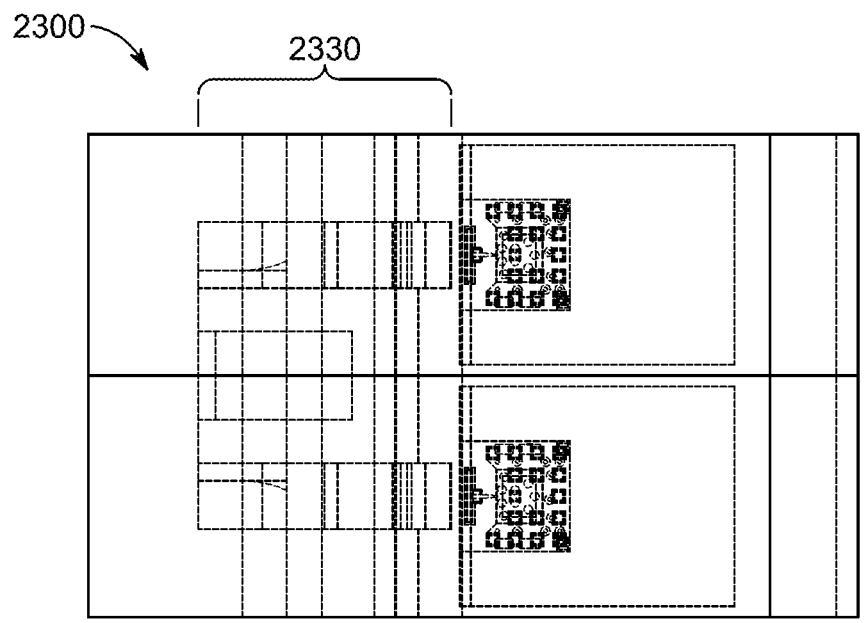

FIGS. 23A-23B show an illustrative clamshell hinge 2300 according to an embodiment, with FIG. 23A showing hinge 2300 in a 0 degree rotation and FIG. 23B showing hinge 2300 in a 90 degree rotation. Hinge 2300 can include body 2310 and body 2320 that are coupled together via hinge assembly 2330 (which may be similar to hinge assembly 1200). FIGS. 23A-23B show illustrative EHF signal propagation (as illustrated by the ovular shaped bubbles) between bodies 2310 and 2320 in both rotation orientations. FIG. 23C shows an illustrative top view of clamshell hinge 2300.

Figure 24:
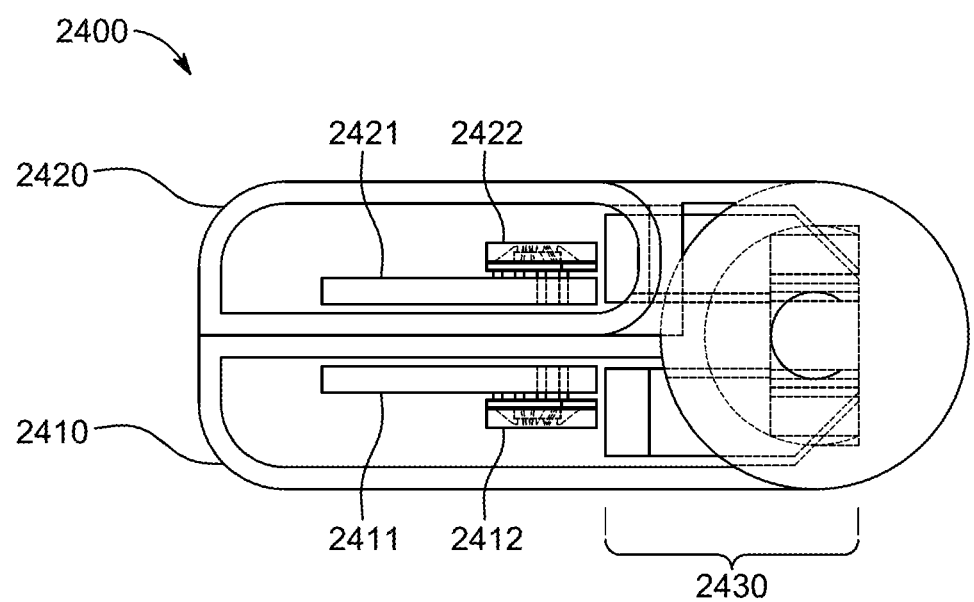
FIG. 24 shows the clamshell hinge according to an embodiment.

FIG. 24 shows an illustrative side view of clamshell hinge 2400 according to an embodiment. Body 2410 can include substrate 2411 with CCU 2412 positioned thereon. Body 2420 can include substrate 2421 with CCU 2422 positioned thereon. Body 2410 and body 2420 may be coupled together via hinge 2430. Body 2420 may be detachably coupled to hinge 2400.

Figure 25A:
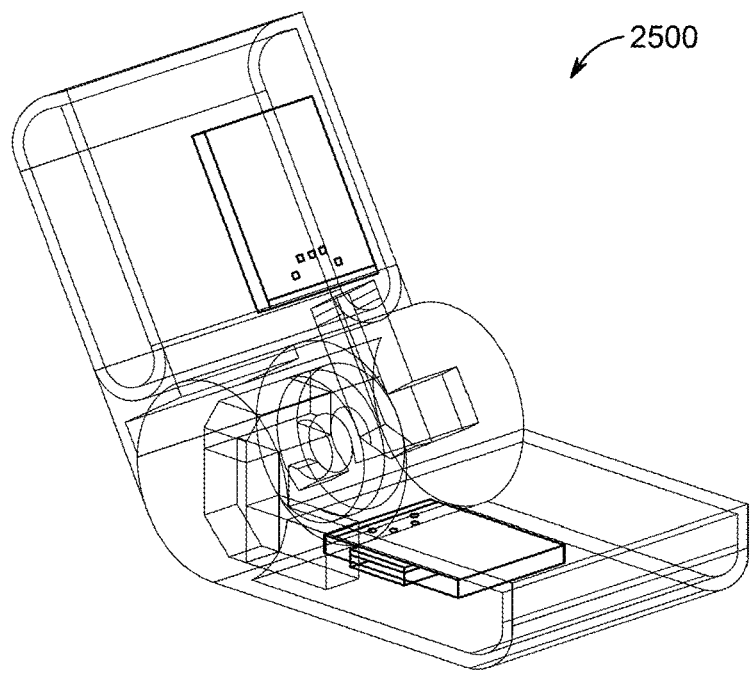
FIGS. 25A and 25B show an illustrative detachable hinge assembly according to an embodiment.
Figure 25B:
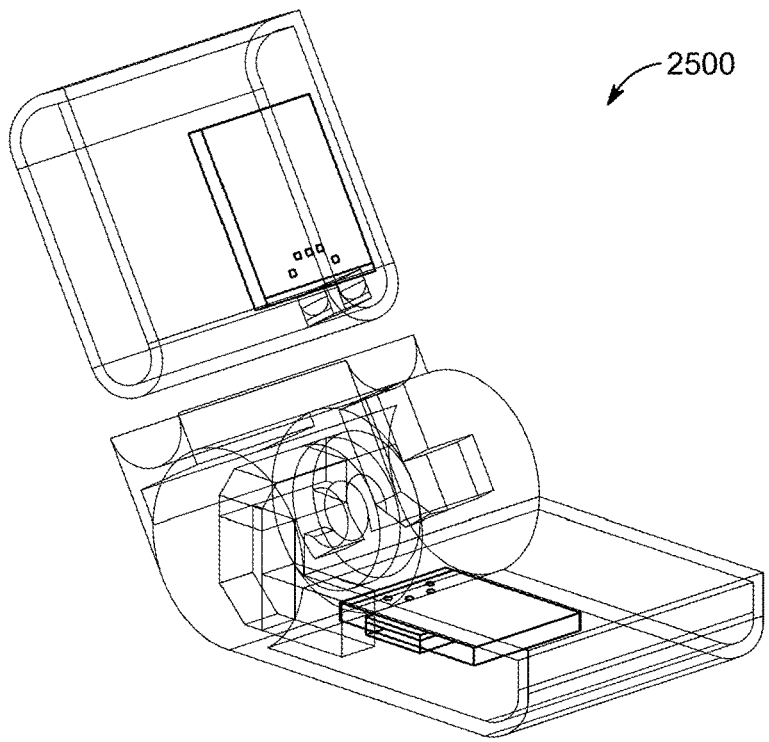

FIGS. 25A and 25B show illustrative detachable hinge assembly 2500 according to an embodiment. FIG. 25A shows assembly 2500 in a docked position and FIG. 25B shows assembly 2500 in a detached position.

Figure 26A:
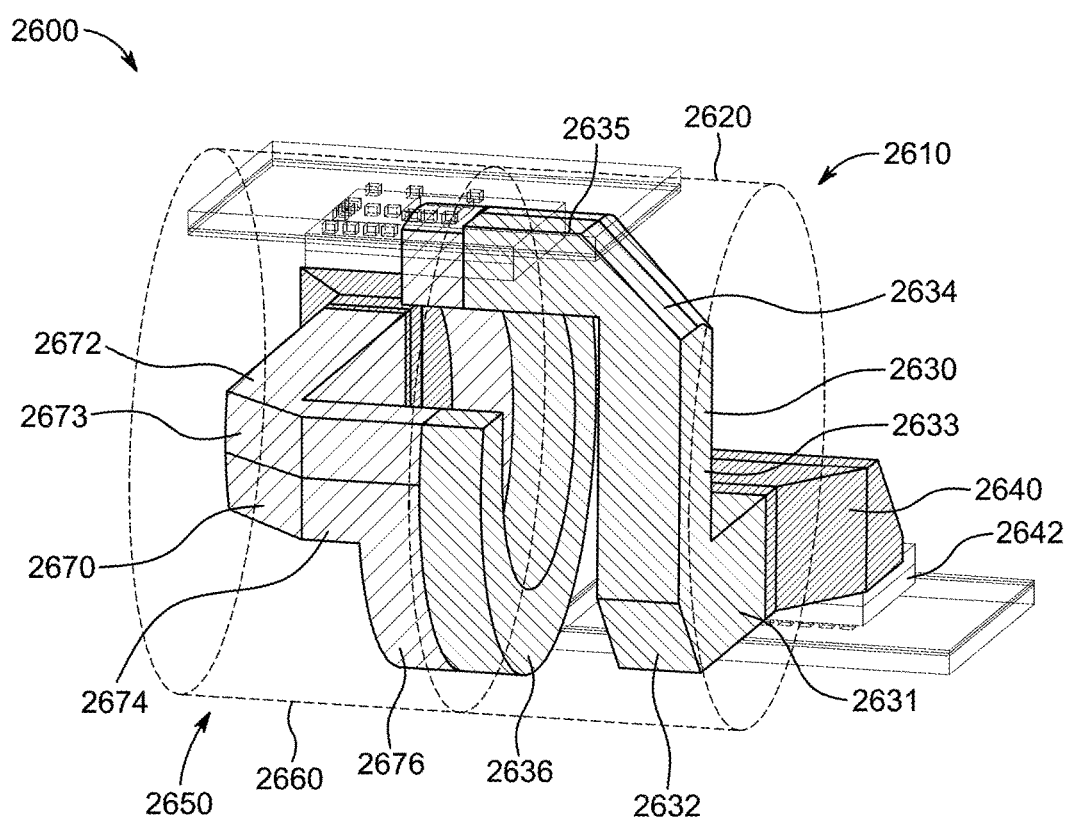
FIGS. 26A-26C show an illustrative rotating hinge assembly according to an embodiment.
Figure 26B:
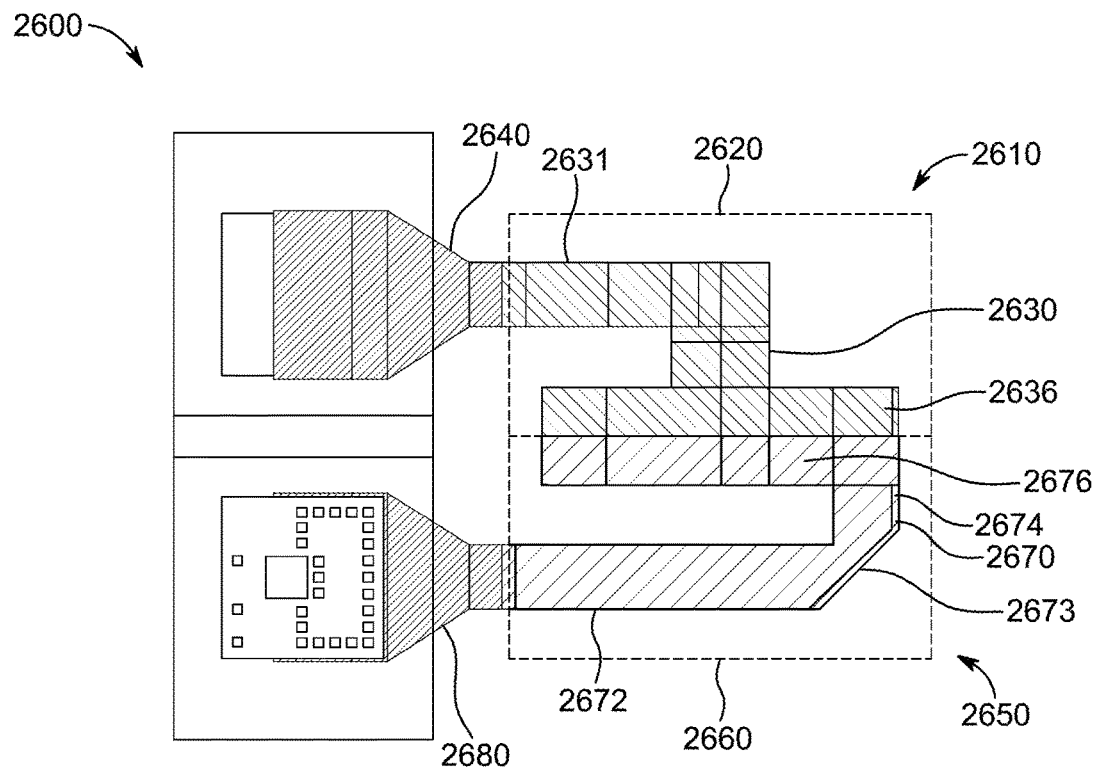
Figure 26C:
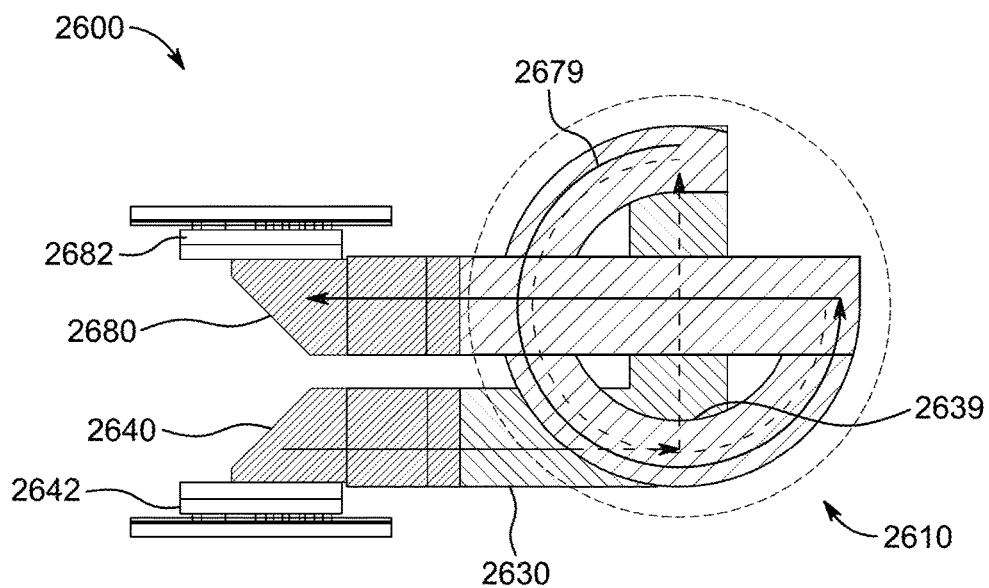

FIGS. 26A-26C show illustrative a rotating hinge assembly 2600 according to an embodiment. In particular, FIG. 26A shows an illustrative perspective view of hinge assembly 2600, FIG. 26B shows an illustrative top view of assembly 2600, and FIG. 26C shows an illustrative side view of assembly 2600. Hinge assembly 2600 can include two subassemblies subassembly 2610 and subassembly 2650 that can rotate between 0 and 270 degrees and maintain a constant real impedance/loading sufficient for EHF signal propagation. Hinge assembly 2600, in FIGS. 26A-26C, is shown in the 0 degree position. The principles of the other embodiments discussed herein apply to hinge assembly 2600. For example, subassembly 2610 can include waveguide 2630 that is at least partially contained within body member 2620, and subassembly 2650 can include waveguide 2670 that is at least partially contained within body member 2660. Waveguide 2630 can interface with launch 2640, which may be positioned over CCU 2642, and waveguide 2670 can interface with launch 2680, which may be positioned over CCU 2682. Launches 2640 and 2680 may direct EHF signal energy to/from CCUs 2642 and 2682 and waveguides 2630 and 2670. Waveguide arcs 2639 and 2679 show the extent to which waveguides 2630 and 2670 can overlap.

Each waveguide 2630 and 2670 can include several straight sections, 90 degree mitered corners, and a semi-circular portion. For example, waveguide 2630 can include straight sections 2631, 2633, and 2635, corners 2632 and 2634, and semi-circular portion 2636. Waveguide 2670 may include straight sections 2672 and 2674, corner 2673, and semi-circular portion 2676. A 90 degree mitered corner can include a 45 degree angle within the corner to reduce EHF signal turbulence as the EHF signal propagates through the waveguide. Corner 2634 may be an E-plane bend that keeps the E-vector in the plane of the bend. Corner 2632 may be an H-plane bend that is perpendicular to the E-vector. Corner 2673 may also be an E-plane bend. EHF energy is propagated into and out of the semicircular coupling region through a series of straight waveguide sections and 90 degree mitered bends. For example, waveguide 2630 has two bends in which the EHF signal energy must traverse and waveguide 2670 has only one bend through which the EHF energy must travel. The number and length of the straight sections and the order of the bends is chosen to determine at which point energy is coupled in/out and the polarization orientation at the input/output ports. In other words, waveguides 2630 and 2670 can be configured differently to accommodate different rotation angles (e.g., something other than 0 to 270 degrees).

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A hinge assembly for use in propagating radio frequency signals, the hinge assembly comprising:
    a first subassembly comprising a first waveguide, wherein the first waveguide comprises a first self-sustaining signal propagation portion and a first co-dependent signal propagation portion;
    a second subassembly that interfaces with the first subassembly and moves at an angular rotation with respect to the first subassembly, the second subassembly comprising a second waveguide, wherein the second waveguide comprises a second self-sustaining signal propagation portion and a second co-dependent signal propagation portion;
    wherein, in a first range of angular rotation, the first and second co-dependent signal propagation portions are in direct contact with each other to form a propagation coupling between the first and second waveguides that enables the radio frequency signals to propagate through the hinge assembly; and
    wherein, in a second range of angular rotation, the first and second co-dependent signal propagation portions are not in direct contact with each other and the radio frequency signals are not able to propagate through the hinge assembly.

2. The hinge assembly of claim 1, wherein when the first and second co-dependent signal propagation portions are in direct contact with each other, signals propagate through the hinge assembly by entering the first subassembly via the first self-sustaining signal propagation portion, propagating through the propagation coupling, and exiting the second subassembly via the second self-sustaining signal propagation portion.

3. The hinge assembly of claim 1, wherein when the first and second co-dependent signal propagation portions are in direct contact with each other, a combined cross-sectional area of the first and second co-dependent signal propagation portions in direct contact with each other is sufficient to enable signal propagation.

4. The hinge assembly of claim 1, wherein each of the first and second self-sustaining signal propagation portion has a cross-sectional area sufficient to enable signal propagation, and wherein each of the first and second co-dependent signal propagation portion has a cross-sectional area insufficient to enable signal propagation.

5. The hinge assembly of claim 1, wherein the first range of angular rotation does not overlap with the second range of angular rotation.

6. The hinge assembly of claim 1, wherein the first subassembly further comprises a plurality of members constructed to at least partially enclose the first waveguide when the plurality of members are coupled together.

7. The hinge assembly of claim 6, wherein the plurality of members comprise a conductive material.

8. The hinge assembly of claim 7, wherein the second subassembly further comprises a plurality of members constructed to at least partially enclose the second waveguide when the plurality of members are coupled together, wherein the plurality of members comprise a conductive material.

9. The hinge assembly of claim 1, wherein the first self-sustaining signal propagation portion comprises a first extension portion and a first transition portion that is integrated with the first extension portion, and wherein the first co-dependent signal propagation portion comprises a first circular portion that is integrated with the first transition portion; and
    wherein the second self-sustaining signal propagation portion comprises a second extension portion and a second transition portion that is integrated with the second extension portion, and wherein the second co-dependent signal propagation portion comprises a second circular portion that is integrated with the second transition portion.

10. The hinge assembly of claim 1, wherein the radio frequency signals are extremely high frequency signals.

11. A hinge assembly comprising:
    a first subassembly that rotates about an axis; and
    a second subassembly that interfaces with the first subassembly and rotates about the axis, the second subassembly comprising:
        a first waveguide comprising a first waveguide interfacing region; and
        first and second members that partially enclose the first waveguide when the first and second members are coupled together to form a first integrated member having a first planar surface that is coplanar with the first waveguide interfacing region, wherein the first planar surface and the first waveguide interfacing region interface with the first subassembly.

12. The hinge assembly of claim 11, wherein the second subassembly comprises a coupling member mounted to the first and second members.

13. The hinge assembly of claim 11, wherein the first member comprises:
    a neck portion having a hollow cavity in which a portion of the first waveguide resides;
    a waveguide retention region having a first recess in which a portion of the first waveguide resides; and
    a waveguide engagement region having a second recess in which the first waveguide interface region resides.

14. The hinge assembly of claim 13, wherein the first member comprises:
    a coupling retainer region having a stop for receiving and retaining a coupling member; and
    an interfacing portion constructed to interlock with a counterpart interfacing portion of the second member.

15. The hinge assembly of claim 11, wherein the second member comprises:
    a waveguide retention region having a third recess into which the first waveguide resides; and
    a waveguide engagement region that abuts against the waveguide interface region.

16. The hinge assembly of claim 15, wherein the second member comprises:
    a coupling retainer region a coupling retainer region having a stop for receiving and retaining a coupling member; and
    an interfacing portion constructed to interlock with a counterpart interfacing portion of the first member.

17. The hinge assembly of claim 11, wherein the waveguide comprises:
    an extension portion;

a transition portion integrated with the extension portion; and a circular portion integrated with the transition portion, wherein the first waveguide interface region exists as part of the circular portion.

18. The hinge assembly of claim 17, wherein the extension portion is aligned along a first axis, and wherein the transition portion comprise a first portion that is aligned along a second axis and a second portion aligned along a third axis, and wherein the circular portion stems from the second portion.

19. The hinge assembly of claim 11, wherein the first subassembly comprises:
 a second waveguide comprising a second waveguide interfacing region;
 third and fourth members that partially enclose the second waveguide when the third and fourth members are coupled together to form a second integrated member having a second planar surface that is coplanar with the second waveguide interfacing region, wherein the second planar surface interfaces with the first planar surface.

20. The hinge assembly of claim 19, wherein the first waveguide interfacing region interfaces with the second waveguide interfacing region when the first and second subassemblies are positioned within a first range of angular rotation of each other.

21. The hinge assembly of claim 20, wherein the first waveguide interfacing region does not interface with the second waveguide interfacing region when the first and second subassemblies are positioned within a second range of angular rotation of each other, wherein the second range of angular rotation does not overlap the first range of angular rotation.

22. An electronic device comprising:
 a first EHF transceiver operative to transmit or receive EHF signals;
 a second EHF transceiver operative to transmit or receive EHF signals; and
 a hinge assembly associated with the first and second EHF transceivers and comprising first and second waveguides, wherein the hinge assembly is operative to enable EHF signals to propagate between the first and second EHF transceivers via the hinge assembly when the first waveguide, which is associated with the first EHF transceiver, is in direct contact with the second waveguide, which is associated with the second EHF transceiver, such that when the first and second waveguides are in direct contact with each other, an EHF propagation coupling exists between the first and second waveguides, and when the first and second waveguides are not in direct contact with each other, the EHF propagation coupling does not exist, wherein when the first and second waveguides are in direct contact with each other, a combination of a first cross-sectional area of a first portion of the first waveguide and a second cross-sectional area of a second portion of the second waveguide yields a combined cross-sectional area sufficient for establishing the EHF propagation coupling, and wherein when the first and second waveguides are not in direct contact with each other, the cross-sectional area of the first portion is not sufficient to carry the EHF signals, and the cross-sectional area of the second portion is not sufficient to carry the EHF signals.

23. The electronic device of claim 22, wherein the hinge assembly rotates about an axis, and wherein a direction of EHF signal travel through the EHF propagation coupling is co-linear with the axis.

24. The electronic device of claim 22, wherein the EHF propagation coupling enables EHF signals being transmitted by the first EHF transceiver to be received by the second EHF transceiver.

25. The electronic device 22, wherein the hinge assembly is a first hinge assembly, and the first and second EHF transceivers are a first coupled pair of EHF transceivers, the electronic device comprising:
 a second coupled pair of EHF transceivers comprising third and fourth EHF transceivers; and
 a second hinge assembly associated with the third and fourth EHF transceivers and comprising third and fourth waveguides, wherein the second hinge assembly is operative to enable EHF signals to propagate between the third and fourth EHF transceivers via the second hinge assembly when the third waveguide, which is associated with the third EHF transceiver, is in direct contact with the fourth waveguide, which is associated with the fourth EHF transceiver, such that when the third and fourth waveguides are in direct contact with each other, a second EHF propagation coupling exists between the third and fourth waveguides, and when the third and fourth waveguides are not in direct contact with each other, the second EHF propagation coupling does not exist.

* * * * *

UNITED STATES PATENT AND TRADEMARK OFFICE
CERTIFICATE OF CORRECTION

| | | |
|---|---|---|
| PATENT NO. | : 10,483,614 B2 | Page 1 of 1 |
| APPLICATION NO. | : 15/708522 | |
| DATED | : November 19, 2019 | |
| INVENTOR(S) | : Besel et al. | |

It is certified that error appears in the above-identified patent and that said Letters Patent is hereby corrected as shown below:

In the Specification

In Column 3, Line 4, delete "embodiment." and insert -- embodiment; --, therefor.

In Column 3, Line 8, delete "19B" and insert -- 19B, --, therefor.

In Column 3, Line 20, delete "embodiment:" and insert -- embodiment; --, therefor.

In the Claims

In Column 26, Line 26, Claim 25, delete "device" and insert -- device of claim --, therefor.

Signed and Sealed this
Twelfth Day of May, 2020

Andrei Iancu
*Director of the United States Patent and Trademark Office*